United States Patent [19]
Rossi et al.

[11] Patent Number: 6,017,859
[45] Date of Patent: *Jan. 25, 2000

[54] POLYMERS DERIVED FROM OLEFINS USEFUL AS LUBRICANT AND FUEL OIL ADDITIVES, PROCESSES FOR PREPARATION OF SUCH POLYMERS AND ADDITIVES AND USE THEREOF

[75] Inventors: Albert Rossi, Warren, N.J.; Jacob Emert, Brooklyn, N.Y.; David Edward Gindelberger, Bedminster, N.J.; Jon Edmond Stanat, Westfield, N.J.; James Peter Stokes, Warren, N.J.; Jaimes Sher, Houston, Tex.

[73] Assignee: Exxon Chemical Patents Inc, Linden, N.J.

[ * ] Notice: This patent is subject to a terminal disclaimer.

[21] Appl. No.: 09/110,005

[22] Filed: Jul. 2, 1998

Related U.S. Application Data

[63] Continuation of application No. 08/663,468, Jun. 17, 1996, Pat. No. 5,811,379.
[51] Int. Cl.$^7$ ............................. C10M 143/00; C10L 1/16
[52] U.S. Cl. .............................. 508/591; 44/459; 585/10; 585/12; 525/331.7; 525/331.9; 525/333.7
[58] Field of Search ................................................ 508/591

[56] References Cited

U.S. PATENT DOCUMENTS 5,811,379  9/1998  Rossi et al. ............................. 508/591

*Primary Examiner*—Ellen M. McAvoy

[57] ABSTRACT

Polymers (including copolymers) derived from one or more olefins, such including ethylene and $C_3$–$C_{20}$ α-olefins such as propylene and 1-butene, which polymers have (a) an average ethylene sequence length, ESL, of from about 1.0 to less than about 3.0; (b) an average of at least 5 branches per 100 carbon atoms of the polymer chains comprising the polymer; (c) at least about 50% of said branches being methyl and/or ethyl branches; (d) at least about 30% of said polymer chains terminated with a vinyl or vinylene group; (e) a number average molecular weight, Mn, of from about 300 to about 15,000 when the polymer is intended for dispersant or wax crystal modifier uses and up to about 500,000 where intended for viscosity modifier uses; and (f) substantial solubility in hydrocarbon and/or synthetic base oil. The polymers are produced using late-transition-metal catalyst systems and, preferably, inexpensive, highly dilute refinery or steam cracker feed streams that have undergone only limited clean-up steps. Fuel and lubricating oil additives, particularly dispersants, wax crystal modifiers and flow improvers, are produced. Where functionalization and derivatization of these polymers is required for such additives it is facilitated by the olefinic structures available in the polymer chains.

30 Claims, No Drawings

POLYMERS DERIVED FROM OLEFINS USEFUL AS LUBRICANT AND FUEL OIL ADDITIVES, PROCESSES FOR PREPARATION OF SUCH POLYMERS AND ADDITIVES AND USE THEREOF

This is a continuation of application Ser. No. 08/663,468, filed Jun. 17, 1996, now U.S. Pat. No. 5,811,379.

FIELD OF THE INVENTION

The invention relates to polymers derived from olefins such as ethylene, $C_3$–$C_{20}$ α-olefins, and mixtures thereof, which possess a specific combination of chemical and physical properties rendering the polymers particularly suitable as "polymer backbones" for the preparation of fuel and lubricating oil additives, particularly dispersants, viscosity modifiers and flow improvers. The invention also relates to improved oil-soluble dispersant additives prepared from the polymers and useful in fuel and lubricating oil compositions, and to concentrates containing the oil-soluble dispersant additives. Furthermore, the invention relates to a continuous process for the polymerization of ethylene, α-olefins and mixtures of ethylene and α-olefins using a late-transition-metal catalyst system using a highly diluted α-olefins feed, preferably obtained from a refinery or steam cracker feedstream.

BACKGROUND OF THE INVENTION

Hydrocarbon oil and fuel oil compositions typically include additives to enhance performance. For example, such oils typically comprise a mixture of at least one hydrocarbon base oil and one or more additives, e.g., dispersant, viscosity modifier, wax crystal modifier (e.g., pour point depressant), detergent, antioxidant, etc. additives, where each additive is employed for the purpose of improving the performance and properties of the base oil in its intended application; e.g., as a lubricating oil, heating oil, diesel oil, middle distillate fuel oil, power transmission fluid and so forth.

Dispersants are typically polymeric materials with an oleophilic characteristic providing oil solubility and a polar characteristic providing dispersancy. The number average molecular weight of a polymer "backbone" used as a vehicle for synthesizing a dispersant is generally 10,000 or less.

Viscosity modifiers also are typically polymeric materials that can be used neat or with suitable functionalization and/or derivatization be used as multifunctional viscosity modifiers. When used as viscosity modifiers the polymer backbone generally has a number average molecular weight of greater than about 15,000.

Dispersants used in lubricating oils typically are hydrocarbon polymers modified to contain nitrogen- and ester-based groups. Polyisobutylene is commonly used in the preparation of dispersants, although other hydrocarbon polymers, such as ethylene-α-olefin copolymers, can be employed as well. It is the primary function of a dispersants to maintain in suspension in the oil those insoluble materials formed by oxidation, etc. during use, thereby preventing sludge flocculation and precipitation. The amount of dispersant employed is dictated by the effectiveness of the particular material in achieving its dispersant function. Dispersants can have additional functions, such as viscosity modifying properties and antioxidancy, depending on their chemical and structural characteristics.

Nitrogen- and ester-based dispersants can be prepared by first functionalizing a long-chain hydrocarbon polymer, e.g., polyisobutylene, and ethylene α-olefin (EAO) copolymers with maleic anhydride to form the corresponding polymer substituted with succinic anhydride groups, and then derivatizing the succinic anhydride-substituted polymer with an amine or an alcohol or the like. Polyisobutylene generally contains residual unsaturation in amounts of about one ethylenic double bond per polymer chain, positioned along the chain, whereas the more recently developed EAO copolymers (based on metallocene catalyst systems) contain a substantial amount of terminal vinylidene unsaturation (see, e.g., WO 94/19436, published Sep. 1, 1994, incorporated herein for the purposes of U.S. patent prosecution.) The ethylenic double bonds serve as sites for functionalization by, for example, the thermal "ene" reaction (i.e., by direct reaction with maleic anhydride or one or more other dicarboxylic acid moieties).

Polyisobutylene (PIB) polymers employed in conventional dispersants are sometimes limited by viscosity effects associated with the polymer as well as limited reactivity. EAO copolymers offer improvements, since these products are primarily terminated with vinylidene type unsaturation, but there are additional efficiencies which can be realized with further improvements in reactivity for functionalization and derivatization; also such copolymers require the use of multiple monomer feed streams to produce a copolymer.

The use of highly diluted, purified refinery monomer feedstreams for ethylene and α-olefin polymerization using a metallocene catalyst system to produce an ethylene α-olefin copolymer has been disclosed in U.S. Ser. No. 992,690 (filed Dec. 17, 1992), incorporated herein for the purposes of U.S. patent prosecution. As a consequence of using a Ziegler-Natta catalyst generally, or a metallocene based catalyst system specifically, there are necessary concerns about the purity of the feedstreams since such catalyst systems are particularly sensitive to moisture as well as nitrogen, sulfur and oxygen compounds which can deactivate the catalyst (see, e.g., WO93/24539, page 13, published Dec. 9, 1993).

Johnson, L. K. et al., in *J. Am Chem Soc.*, 1995, 117, 6414, describe the use of Ni and Pd complexes using various activators (including MAO and alkyl aluminum chloride) for the solution homopolymerization of ethylene, propylene, and 1-hexene. Polymers varying in molecular weight, branch length and crystallinity are disclosed.

Johnson, L. K. et al., in *J. Am Chem Soc.*, 1996, 118, 267, describe the solution copolymerization of ethylene with polar (acrylate) comonomers using a Pd catalyst. The copolymers are disclosed as random, amorphous, and branched with functional groups located predominantly at branch ends.

Brookhart, M. S. et al., in published patent application EP 0 454 231 A2 (1991) describe a catalyst for the polymerization of ethylene, α-olefins, diolefins, functionalized olefins, and alkynes. The general description of the catalyst broadly includes Group VIIIb metals (Groups 8, 9, 10); cobalt and nickel are exemplified in solution polymerizations to produce oligomers and polymers of limited molecular weight.

Brookhart, M. et al. in *J. Am. Chem. Soc.*, 1994, 116, 3641 and 1992, 114, 5894 describe the use of Pd(II) catalysts to produce alternating olefin/CO copolymers. (Subsequently, it is noted in *J. Am Chem Soc.*, 1995, 117, 6414 that the complexes used in the 1992 reference only dimerize ethylene.)

Keim, W. et al. in *Angew. Chem., Int. Ed. Engl.*, 1981, 20, 116 describe the use of an aminobis(imino)phosphorane complex of Ni to polymerize ethylene under pressure in a toluene solution. The polymer is said to contain short chain branches.

Möhring, V. M. et al. in *Angew. Chem., Int. Ed. Engl.*, 1985, 24, 1001 describe the use of the catalyst system aminobis(imino)phosphorane complex of Ni to polymerize $C_3$ to $C_{20}$ linear α-olefins and singly branched α-olefins. Olefins containing quaternary carbons, vinylene, or vinylidene groups did polymerize, but copolymers of α-olefins could be obtained. Polymerization of linear α-olefins produced polymers containing methyl branches evenly spaced corresponding to the length of the olefin chain. (A "chain running" mechanism proposed as an explanation for the branched polymer structure is also described by L. K. Johnson in *J. Am Chem Soc.*, 1995, 117, 6414, above.)

Peuckert, M. et al. in *Organometallics*, 1983, 2, 594 describe a Ni catalyst for the oligomerization of ethylene in toluene. The catalysts are said to contain the chelating phosphino-acetate ligand used in SHOP catalysts. The $C_4$ to $C_{24}$ oligomers are >99% linear and >93% α-olefin. An ethylene/hexene co-oligomerization produced product with no detectable branches.

It has been found in the present invention, that further improvements can be achieved in the performance of fuel and lubricant additives, particularly including ashless dispersants and wax crystal modifiers, based on the use of olefinically derived polymers; also, significant improvements in the economics of producing and using such additives can be achieved by selective use of late-transition-metal catalysts and polymerization processes which use highly dilute refinery or steam cracker olefin feedstreams to produce a polymer having a unique combination of properties for subsequent functionalization and derivatization.

SUMMARY OF THE INVENTION

Mono-unsaturated olefinic hydrocarbon polymers suitable for use as a fuel or lubricant additives, derived from olefins including ethylene and α-olefins such as propylene, 1-butene, etc. (referred to as MOH polymers) which can be characterized by a complex set of properties: (a) an average ethylene sequence length, ESL, of from about 1.0 to less than about 3.0; (b) an average of at least 5 branches per 100 carbon atoms of the polymer chains comprising said polymer; (c) at least about 50% of such branches being methyl and/or ethyl branches; (d) at least about 30% of the polymer chains terminated with a vinyl or vinylene group; (e) a number average molecular weight, Mn of from about 300 to about 10,000 for dispersant uses and from about 15,000 to about 500,000 for viscosity modifier uses; and (f) substantial solubility of the polymer in hydrocarbon and/or synthetic base oil.

This combination of properties yields MOH polymers of the invention especially suitable for use as polymer backbones in the preparation of lubricating and fuel oil additives, particularly dispersant additives, as well as for use as wax crystal modifiers and viscosity modifiers. When used as a dispersant backbone, the limited range of number average molecular weight characterizing the MOH polymers of the present invention ensures that dispersants produced therefrom are substantially soluble in lubricating base oils, and, simultaneously, avoids or reduces handling problems due to high viscosity levels and wax crystal interactions. Furthermore, the defined polymer properties also result in products which have the desired level of wax interaction for their use as wax crystal modifiers and the solution viscosity/temperature properties for use as viscosity modifiers. Because of the relatively high level of terminal vinyl and vinylene unsaturation in the inventive MOH polymers, the dispersant additives produced therefrom have high active ingredient concentrations, thereby providing enhanced lubricating oil dispersancy, including enhanced sludge and varnish control properties.

The polymers of the present invention are preferably produced using a process which employs as the monomer(s) highly dilute refinery or steam cracker feedstream(s) based on $C_3$, $C_4$ or $C_5$ sources with or without added ethylene. The process is particularly advantageous in that the monomer feedstream need not be totally free of materials which would otherwise be poisons for Ziegler-Natta or metallocene based catalyst systems.

Furthermore, the polymers of the present invention and the dispersant additives produced therefrom, will possess enhanced pour point performance in lubricating oil compositions to which they are added, particularly in compositions which also contain conventional lubricating oil flow improvers (LOFI's). This beneficial pour point behavior of the dispersants is believed to be attributable in part to the unique polymer chain structure achievable with the late-transition-metal catalyst system.

A further aspect of this invention relates to the MOH polymer functionalized with reactive groups, such as by substitution with mono- or dicarboxylic acid materials (i.e., acid, anhydride or acid ester) produced by reacting (e.g., by the "ene" reaction) the MOH polymers of the invention with mono-unsaturated carboxylic reactants. The monocarboxylic acid and the dicarboxylic acid or anhydride substituted MOH polymers are useful per se as additives to lubricating oils, and, in another aspect of this invention, can also be reacted with nucleophilic reagents, such as amines, alcohols, amino alcohols and metal compounds, to form derivative products which are also useful as lubricating oil additives, e.g., as dispersants.

In still another aspect of this invention, lubricating oil additives are produced by functionalizing the MOH polymers of the invention using reactants other than the mono-unsaturated carboxylic reactants described above. Accordingly, the copolymer can be functionalized by reaction with a hydroxy aromatic compound in the presence of a catalytically effective amount of at least one acidic alkylation catalyst. Subsequently, the alkylated hydroxyaromatic compound can be reacted by Mannich Base condensation with an aldehyde and an amine reagent to provide a derivatized copolymer.

Lubricating oil additives within the scope of this invention are also produced by oxidation of the MOH polymer of the invention, such as oxidation with a gas containing oxygen and/or ozone. The polymer can also be functionalized by hydroformylation and by epoxidation. The MOH polymers can also be functionalized by contacting the polymers under Koch reaction conditions with carbon monoxide in the presence of an acidic catalyst and a nucleophilic trapping agent such as water or a hydroxy-containing compound or a thiol-containing compound to form carboxyl groups on the polymer. Functionalization can also be accomplished using "Reppe" reaction chemistry (as described in a copending application, U.S. Ser. No. 08/663,465, filed Jun. 17, 1996, and incorporated herein by reference for the purposes of U.S. prosecution, Docket No. PT-1266). Furthermore, the aforesaid functionalized polymers formed by oxidation, hydroformylation, epoxidation, and Koch reaction can be derivatized by reaction with at least one derivatizing compound to form derivatized polymers.

DETAILED DESCRIPTION OF THE INVENTION

The present invention relates to polymers derived from olefins such as ethylene, propylene and 1-butene characterized by a certain combination of chemical and physical properties which makes the polymers especially suitable for use as the backbone of dispersant additives. More particularly, the mono-unsaturated olefinic hydrocarbon (MOH) polymers of the invention possess a relatively high degree of terminal vinyl and/or vinylene unsaturation, a number average molecular weight within defined ranges, controlled ethylene sequence length within polymer chains, and the ability to form mineral and/or synthetic oil solutions. Each of these properties contributes in one or more respects to the utility of the copolymer as a dispersant backbone.

Preparation of the Mono-unsaturated Olefinic Hydrocarbon Polymer

Mono-unsaturated olefinic hydrocarbon ("MOH") polymers of the present invention having a relatively high degree of terminal vinyl and/or vinylene unsaturation, for example, at least about 30% of the polymer chains, can be prepared by polymerizing at least one olefinic monomer selected from the group consisting of (a) ethylene, (b) one or more α-olefins or (c) mixtures of (a) and (b) and optionally, an additional polyene, in the presence of a late-transition-metal catalyst system described below. The MOH polymer chain structure can be controlled through the selection of the late-transition-metal catalyst system and by controlling the relative proportions of the ethylene and/or other α-olefins. One preferred method for preparing the MOH polymers is described in more detail below; it is based on the use of one or more highly diluted monomer feedstreams originating in a refinery or steam cracker.

The polymerization catalyst useful for this invention can be derived from the late-transition-metal compounds of formula:

$$LMX_r$$

wherein M is a Group 9, 10, or 11 metal, preferably a $d^6$, $d^8$ or $d^{10}$ metal, most preferably $d^8$ (wherein "Group" refers to the identified group of the Periodic Table of Elements, comprehensively presented in "Advanced Inorganic Chemistry," F. A. Cotton, G. Wilkinson, Fifth Edition, 1988, John Wiley & Sons);

L is a bidentate ligand that stabilizes a square planar geometry and charge balances the oxidation state of $MX_r$;

each X is, independently, a hydride radical, a hydrocarbyl radical, a substituted hydrocarbyl radical, a halocarbyl radical, a substituted halocarbyl radical, and hydrocarbyl- and halocarbyl-substituted organometalloid radicals; or two X's are joined and bound to the metal atom to form a metallacycle ring containing from about 3 to about 20 carbon atoms; or one or more X can be a neutral hydrocarbyl containing donor ligand, e.g., an olefin, diolefin, aryne ligand; and r=0, 1, 2, or 3. When Lewis-acid activators, such as methylalumoxane, aluminum alkyls or alkylaluminum halides, which are capable of donating an X ligand as described above to the transition metal component, are used, one or more X may additionally be independently selected from the group consisting of a halogen, alkoxide, aryloxide, amide, phosphide or other univalent anionic ligand or two such X's joined to form an anionic chelating ligand; or one or more neutral non-hydrocarbyl atom containing donor ligand, e.g., phosphine, amine, nitrile or CO ligand.

In a preferred embodiment of the invention, the bidentate ligand, L, is defined by the following formula:

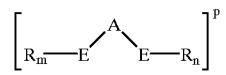

wherein A is a bridging group containing a Group 13–15 element;

each E is independently a Group 15 or 16 element bonded to M;

each R is independently a $C_1$–$C_{30}$ containing radical group which is a hydrocarbyl, substituted-hydrocarbyl, halocarbyl, substituted-halocarbyl, hydrocarbyl-substituted organometalloid, halocarbyl-substituted organometalloid;

m and n are independently 1 or 2, depending on the valency of E; and p is the charge on the bidentate ligand such that the valency of $MX_r$ is satisfied.

In the most preferred embodiment of the invention, the bridging group, A, is defined by the following formulas:

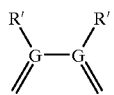

A-1

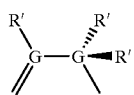

A-2

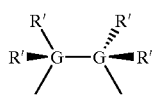

A-3

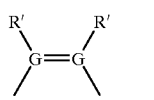

A-4

A-5

A-6

A-7

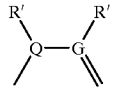

A-8

-continued

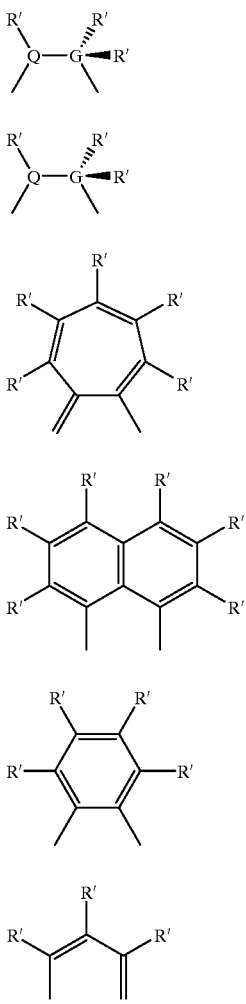

A-9

A-10

A-11

A-12

A-13

A-14 wherein G is Group 14 element especially C, Si, and Ge;
Q is a Group 13 element especially B, and Al; and
R' are independently hydride radicals, $C_1$–$C_{30}$ hydrocarbyl radicals, substituted hydrocarbyl radicals, halocarbyl radicals, substituted halocarbyl radicals, and hydrocarbyl- and halocarbyl-substituted organometalloid radicals, and optionally two or more adjacent R' may form one or more $C_4$ to $C_{40}$ ring to give a saturated or unsaturated cyclic or polycyclic ring.

Also in the most preferred embodiment of the invention, R is a bulky $C_1$–$C_{30}$ containing radical group which is a hydrocarbyl, substituted-hydrocarbyl, halocarbyl, substituted-halocarbyl, hydrocarbyl-substituted organometalloid, halocarbyl-substituted organometalloid. Bulky radical groups include phenyls, substituted phenyls, alkyls and substituted alkyls, especially those bonded to E through a tertiary carbon atom, alicyclics and polyaclicyclics containing hydrocarbyls, especially those bonded to E through a tertiary carbon and the like.

In the definitions above, the term "substituted" is as defined or refers to $C_1$–$C_{30}$ containing radicals which are to be essentially hydrocarbyl, but may include one or more non-hydrocarbyl atoms (such as Si, Ge, O, S, N, P, halogen, etc.) in place of one or more carbon atoms.

In the very most preferred embodiment of this invention, M is a group 10 metal, E is a group 15 element, especially nitrogen, with m and n being one and p being zero, the bridge is as drawn in A-1, and R is a substituted phenyl group preferably substituted in at least the 2 and 6 positions with R' groups.

Various forms of the catalyst system of the late-transition-metal type may be used in the polymerization process of this invention. Several disclosures in the art which include such catalysts are discussed above and are incorporated herein by reference for the purposes of U.S. prosecution; these publications teach the structure of various late-transition-metal catalysts and include alumoxane as a cocatalyst. There are a variety of methods for preparing alumoxane, one of which is described in U.S. Pat. No. 4,665,208, and it is also available commercially.

For the purposes of this patent specification, the terms "cocatalysts or activators" are used interchangeably and are defined to be any compound or component which can activate a bulky ligand transition metal compound. The late-transition-metal catalyst compounds according to the invention may be activated for polymerization catalysis in any manner sufficient to allow coordination polymerization. This can be achieved, for example, when one X ligand can be abstracted and the other X will either allow insertion of the unsaturated monomers or will be similarly abstractable for replacement with an X that allows insertion of the unsaturated monomer. The traditional activators of metallocene polymerization art are suitable activators; those typically include Lewis acids such as alumoxane compounds, and ionizing, anion pre-cursor compounds that abstract one X so as to ionize the transition metal center into a cation and provide a counterbalancing, compatible, noncoordinating anion.

Alkylalumoxanes and modified alkylalumoxanes are suitable as catalyst activators. The alumoxane component useful as catalyst activator typically is an oligomeric aluminum compound represented by the general formula (R"—Al—O)$_n$, which is a cyclic compound, or R"(R"—Al—O)$_n$AlR"$_2$, which is a linear compound. In the general alumoxane formula R" is independently a $C_1$ to $C_{10}$ alkyl radical, for example, methyl, ethyl, propyl, butyl or pentyl and "n" is an integer from 1 to about 50. R" may also be, independently, halogen, including fluorine, chlorine and iodine, and other non-hydrocarbyl monovalent ligands such as amide, alkoxide and the like, provided that not more than 25% of R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180, each being incorporated by reference for purposes of U.S. patent practice.

When the activator is an alumoxane, the preferred transition metal compound to activator molar ratio is from 1:10000 to 10:1, more preferably from about 1:5000 to 10:1, even more preferably from about 1:1000 to 1:1.

The term "noncoordinating anion" as used for the ionizing, anion pre-cursor compounds is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the late-transition-metal catalyst compounds and the ionizing, anion pre-cursor compounds decomposes. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the late-transition-metal cation in the sense of balancing its ionic charge in a+1 state, yet retain sufficient lability to permit displacement by an olefinically unsaturated monomer during polymerization. Additionally, the anions useful in this invention will be large or bulky in the sense of sufficient molecular size to partially inhibit or help to prevent neutralization of the late-transition-metal cation by Lewis bases other than the polymerizable monomers that may be present in the polymerization process.

Descriptions of ionic catalysts, those comprising a transition metal cation (based on metallocenes) and a non-coordinating anion, suitable for coordination polymerization appear in U.S. Pat. Nos. 5,064,802, 5,132,380, 5,198,401, 5,278,119, 5,321,106, 5,347,024, 5,408,017, WO 92100333 and WO 93/14132. These references teach a preferred method of preparation wherein metallocenes are protonated by an anion precursor such that an alkyl/hydride group is abstracted from a transition metal to make it both cationic and charge-balanced by the non-coordinating anion. These teachings may be useful to those skilled in the art for the late-transition-metal catalysts of the present invention.

The use of ionizing ionic compounds not containing an active proton but capable of producing both the active metal cation and an noncoordinating anion is also known. See, EP-A-0 426 637, EP-A-0 573 403 and U.S. Pat. No. 5,387, 568. Reactive cations other than the Brönsted acids include ferrocenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a non-coordinating anion as described above. The hydrated salts can be prepared by reaction of the metal cation-non-coordinating anion salt with water, for example, by hydrolysis of the commercially available or readily synthesized LiB(pfp)$_4$ which yields [Li.xH$_2$O] [B(pfp)$_4$], where (pfp) is pentafluorophenyl or perfluorophenyl.

Any metal or metalloid capable of forming a coordination complex which is resistant to degradation by water (or other Brönsted or Lewis Acids) may be used or contained in the anion. Suitable metals include, but are not limited to, aluminum, gold, platinum and the like. Suitable metalloids include, but are not limited to, boron, phosphorus, silicon and the like. The description of non-coordinating anions and precursors thereto of the documents of the foregoing paragraphs are incorporated by reference for purposes of U.S. patent practice.

An additional method of making the ionic catalysts uses ionizing anion precursors which are initially neutral Lewis acids but form the cation and anion upon ionizing reaction with the late-transition-metal compounds, for example tris (pentafluorophenyl) boron acts to abstract a hydrocarbyl, hydride or silyl ligand to yield a late-transition-metal cation and stabilizing non-coordinating anion; see EP-A-0 427 697 and EP-A-0 520 732 which are directed to metallocene catalyst systems. Ionic catalysts for coordination polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

When the cation portion of an ionic non-coordinating precursor is a Brönsted acid such as protons or protonated Lewis bases (excluding water), or a reducible Lewis acid such as ferricinium or silver cations, or alkaline metal or alkaline earth metal cations such as those of sodium, magnesium or lithium cations, the transition metal to activator molar ratio may be any ratio, but preferably from about 10:1 to 1:10; more preferably from about 5:1 to 1:5; even more preferably from about 2:1 to 1:2; and most preferably from about 1.2:1 to 1:1.2 with the ratio of about 1:1 being the most preferred.

A further useful method of activating the late-transition-metal catalyst is to employ a Ziegler cocatalyst. Such cocatalysts will typically be organometallic compounds of a metal of Groups 1, 2, 12, or 13 of the Periodic Table selected from the group consisting of aluminum alkyl, aluminum alkyl halide and aluminum halide. These can be represented by the formulas:

Al $(R)_m(R')_nX_{3-m-n}$ wherein R' and R are independently hydrocarbyl, including $C_1$ to $C_{10}$ aliphatic, alicyclic or aromatic hydrocarbon radicals which may be the same or different; X is a halogen such as chlorine, bromine or iodine; m and n are integers from 0 to 3 and the sum of (m + n) $\leq$ 3; and $Al_2R_3X_3$ which are hydrocarbylaluminum sesquihalides, such as $Al_2Et_3Cl_3$ and $Al_2(iBu)_3Cl_3$; wherein Et is ethyl and iBu is isobutyl.

Examples include triethyl aluminum, diethyl aluminum chloride, $Al_2Et_3Cl_3$ and $Al_2(iBu)_3Cl_3$. As is generally recognized in the art, these Ziegler cocatalyst compounds will not effectively activate metallocene catalyst compounds. In a preferred method this activator is reacted with the late-transition-metal catalyst prior to addition of the activated catalyst system to the polymerization reactor.

Further useful late-transition-metal catalysts include those which are known as supported catalysts. Useful catalyst systems of this type are disclosed in the U.S. patent application titled "Supported Late Transition Metal Catalyst Systems" (G. A. Vaughan et al., U.S. Ser. No. ____, filed Jun. 17, 1996, Docket No. 96B035; incorporated herein by reference for purposes of U.S. prosecution).

When using ionic catalysts of the late-transition-metals comprising cations and non-coordinating anions, the total catalyst system can additionally comprise one or more scavenging compounds. The term "scavenging compounds" is meant to include those compounds effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity, particularly when a late-transition-metal cation-noncoordinating anion pair is the catalyst system. The polar impurities, or catalyst poisons include water, oxygen, metal impurities, etc. While the late-transition-metal catalysts of the present invention can be less sensitive to impurities than those of the prior art, e.g., metallocene catalyst systems, reduction or elimination of poisons is a desirable objective. Preferably steps are taken before provision of such into the reaction vessel, for example by chemical treatment or careful separation techniques after or during the synthesis or preparation of the various components; some minor amounts of scavenging compound can still normally be used in the polymerization process itself.

Typically the scavenging compound will be an organometallic compound such as the Group 13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminoxane, and n-octyl aluminum. Those scavenging compounds having bulky or $C_8$–$C_{20}$ linear hydrocarbyl substituents covalently bound to the metal or metalloid center being preferred to minimize adverse interaction with the active catalyst. When alumoxane is used as activator, any excess over the amount of late-transition-metal present will act as scavenger compounds and additional scavenging compounds may not be necessary. The amount of scavenging agent to be used with late-transition-metal cation-non-coordinating anion pairs is minimized during polymerization reactions to that amount effective to enhance activity.

Polymerization Process

Generally, the polymerization process is preferably conducted in a continuous manner by simultaneously feeding one or more refinery or steam cracker feedstream containing the monomer(s), or separate streams of reaction diluent (if employed), monomers, catalyst and cocatalyst to a reactor and withdrawing solvent, unreacted monomer and polymer from the reactor, allowing sufficient residence time to form polymer of the desired molecular weight, and subsequently separating the polymer from the reaction mixture.

The preferred process for producing the MOH polymer is a continuous process using a highly diluted, refinery or steam cracker monomer feedstream in combination with a late-transition-metal catalyst system. Several advantages result from such a process:

(1) the use of dilute monomer feeds results in a lower concentration gradient at the point of monomer introduction into the reactor and, consequently, less time is required to achieve uniform monomer mixing and less time is available for higher molecular weight species formation at the input port;

(2) the use of dilute feeds enables the process to operate at high conversion rates without the attendant buildup of mass transfer resistance attributable to polymer formation in pure feed systems;

(3) in a preferred embodiment of the process of the present invention employing a boiling reactor and dilute feed, monomer in the vapor space and in the liquid reaction mixture are in equilibrium, particularly when ethylene is used as a comonomer. This is achievable because of the ease of attaining uniform mixing resulting in a reaction mixture having essentially no mass transfer resistance at the liquid/vapor interface;

(4) still further improvements are possible [where two or more monomers are polymerized] by the presence of a high concentration of diluent in the olefin feed, such that the major constituents of the diluent boil at about the same temperature as the α-olefin(s) to be polymerized or, where applicable, copolymerized with, e.g., ethylene. Accordingly, where copolymerization with ethylene is involved, ethylene content in the vapor space is further diluted by the α-olefin feed constituents, a major portion of which is diluent. Thus, evaporative cooling does not depend on recycle of high amounts of ethylene in the vapor, ethylene buildup in the reflux is further minimized, and mass transfer resistance to ethylene mixing is further reduced;

(5) a boiling reactor allows the polymerization reaction to be accomplished in a highly isothermal manner because the heat of reaction is easily removed by boiling unreacted monomer and diluents out of the reaction media at nearly constant temperatures, resulting in a narrower molecular weight distribution MOH polymer;

(6) where a copolymer is produced, uniformity of the polymer is greatly enhanced without the need for manipulation of the condensed vapor to alter its compositional distribution;

(7) the combined use of dilute feed and high conversion facilitates removal of catalyst (deashing) residue and quenching of the polymer/catalyst mixture since it is easier to mix the polymer with deashing and quench media;

(8) use of dilute α-olefin containing feeds and high conversion allows for a significant improvement in the overall economics of the process because such dilute feeds can be readily obtained at very low cost as by-product or waste streams derived from other commercial sources, for example, refinery or steam cracker feed streams containing $C_3$, $C_4$ or $C_5$ olefins.

Polymers produced in accordance with the process of the present invention are polymers comprising monomer units derived from at least one olefin such as ethylene and α-olefins. Such monomers are characterized by the presence within their structure of at least one ethylenically unsaturated group of the structure >C=$CH_2$ and are highly reactive at low catalyst concentrations. Late-transition-metal catalyzed polymerizations are particularly adaptable for use with ethylene and α-olefin monomers; other olefinically unsaturated monomers may be less reactive. Therefore, various components in suitable refinery or steam cracker streams such as a Raffinate-2 stream (e.g., components such as 2-butenes, and isobutylene), may have limited reactivity in the presence of a late-transition-metal catalyst system. Such components may be considered diluents in the present process and need not be separated from the polymerizable component(s) of the feedstream. Other constituents which may be undesirable, such as butadiene, are made non-reactive or non-poisonous to the catalyst by pre-saturating the double bonds with hydrogen.

Accordingly, suitable α-olefin monomers include those represented by the structural formula $H_2C=CHR^1$ wherein $R^1$ is straight chain or branched chain alkyl radical comprising 1 to 18 carbon atoms and wherein the polymer formed therefrom contains a high degree of terminal vinyl and vinylene unsaturation. Preferably $R^1$ in the above formula is alkyl of from 1 to 16 carbon atoms, more preferably alkyl of from 1 to 12 carbon atoms, particularly for use as wax crystal modifiers. Those monomers suitable for preparing polymers intended for use as dispersant backbones are typically those where $R^1$ in the above formula is aikyl of from 1 to 8 carbon atoms, preferably alkyl of from 1 to 6 carbon atoms. Therefore, useful monomers include ethylene, propylene, butene-1, pentene-1, 4-methylpentene-1, hexene-1, octene-1, decene-1, dodecene-1, tridecene-1, tetradecene-1, pentadecene-1, hexadecene-1, heptadecene-1, octadecene-1, nonadecene-1 and mixtures thereof (e.g., mixtures of ethylene and butene-1, ethylene and propylene, propylene and butene-1, octene-1 and tetradecene-1 and the like).

After polymerization and, optionally, deactivation of the catalyst (e.g., by conventional techniques such as contacting the polymerization reaction medium with an excess of water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization is preferably conducted employing as the reaction medium, a highly diluted monomer feedstream obtained from a refinery or steam cracker. In such a medium there is present a hydrocarbon inert to the polymerization such as butane, isobutane, pentane, isopentane, hexane, isooctane, decane, toluene, xylene, and the like. Alternatively, the polymerization may be conducted using substantially pure monomers, e.g., ethylene and/or propylene. In a process which uses a refinery or steam cracker feedstream, the feedstream containing the primary monomer to be polymerized, e.g., 1-butene, typically contains certain amounts of other $C_4$ hydrocarbons. More particularly, the feedstream can comprise less than 5 weight percent isobutylene, at least 12 weight percent total n-butenes (i.e., 1-butene and 2-butene), and less than 1 weight percent butadiene, together with n-butane and isobutane. When used to prepare the MOH polymer, a preferred $C_4$ feed stream comprises spent $C_4$ streams produced as by-product in the manufacture of polyisobutylene, wherein the $C_4$ feedstream (often referred to as Raffinate II) contains less than 5 weight percent isobutylene, 10 to 70 weight percent saturated butanes and 15 to 85 weight percent 1-butene and 2-butene. The saturated butanes function as a diluent or solvent in the reaction mixture. Typically the $C_4$ feedstream is maintained at a sufficient pressure to be in the liquid form both at the reactor inlet and in the reaction mixture itself at the reaction temperature.

The preferred reaction process of the present invention is continuous, employs a dilute feed, and is operated to achieve a high level of monomer conversion. For purposes of this invention "continuous" means that a feed stream containing the olefinic monomer is continuously introduced into the reaction zone and resultant MOH polymer product is continuously withdrawn.

The advantages of employing a highly diluted monomer feed are described above. For the purposes of the present invention, the diluent can be any non-reactive (under the conditions employed) material which preferably is capable of: (i) being liquefied under reaction conditions; (ii) dissolving at least the α-olefin monomer where one is employed; and (iii) dissolving or at least suspending the polymer product under reaction conditions such that viscosity buildup is sufficiently minimized to the extent that the mass transfer rate of the olefin, and ethylene in particular, needed to homogeneously distribute olefin throughout the reaction zone is at least equal to and preferably is greater than, the reaction rate at which olefin is consumed in the polymerization reaction. Suitable but less preferred diluents include such solvents as alkanes, aromatic hydrocarbons, and non-reactive alkenes. It is contemplated that the non-reactive diluents comprise typically at least 30, preferably at least 40, and most preferably at least 50 weight % of the α-olefin feed stream and the diluent can range typically from 30 to 90 (for example from 35 to 75 weight %) preferably from 40 percent to 80, and most preferably from 50 to 60 weight % of the α-olefin feed stream (where ethylene is used as a comonomer, the recited levels refer to concentrations before admixture with ethylene).

It is a particular advantage of the present invention that the preferred monomer feedstream comprises preferred diluents which are present in various refinery or steam cracker streams containing α-olefin monomer reactants; to be useful such streams must contain at least one α-olefin as the reactive constituent. However, these streams typically will contain non-reactive constituents which have a similar carbon number to the α-olefin. The similarity in carbon number causes the non-reactive constituents to have similar boiling points to the α-olefin. Consequently, the non-reactive constituents will vaporize together with the α-olefin and not only dilute the α-olefin in the vapor space, but also, where used, ethylene comonomer. This dilution effect decreases the mass transfer resistance of the reactive monomers in the vapor space, particularly ethylene.

Accordingly, a preferred diluent will contain components comprising typically at least 50, preferably at least 75, and most preferably at least 95 weight %, and typically from 50 to 100, preferably from 75 to 100, and most preferably from 95 to 100 weight % thereof, having a boiling point at the reaction conditions of typically within ±20° C., preferably within ±15° C., and most preferably within ±10° C. of the average boiling point of the α-olefin constituents of the feed. Representative of such refinery or steam cracker streams are those which contain butene-1, propylene or $C_5$ α-olefin. Preferred butene-1 containing streams are referred to herein as Raffinate-2 streams. Such streams typically have isobutylene content significantly lowered in relation to the stream from which they are derived. Raffinate-2 is typically derived from either butane/butene catalytic cracking or refinery streams (BB-streams) or Raffinate-1 which, in turn, is derived from butadiene crude produced by steam cracking plants. The composition of Raffinate-2 can vary widely, depending upon the source, e.g., (weight %):

| Component | Crude Butadiene | Raff-2 From Crude | BB | Raff-2 From BB | Raff-1 |
| --- | --- | --- | --- | --- | --- |
| Butadiene | 43.5 ± 20 | 0–5 | 0.3 ± .15 | 0.4 ± 0.2 | 0.1 ± .05 |
| Isobutylene | 25.2 ± 10 | 0–5 | 12.6 ± 6 | 0.2 ± 0.1 | 44.6 ± 20 |
| Butene-1 | 15.5 ± 8 | 49.5 ± 25 | 13.6 ± 6 | 15.4 ± 7 | 27.4 ± 15 |
| cis-Butene-2 | 2.0 ± 1 | 6.4 ± 3 | 9.0 ± 4 | 10.2 ± 5 | 3.5 ± 1.5 |
| trans-Butene-2 | 6.2 ± 3 | 19.6 ± 10 | 13.8 ± 6 | 15.6 ± 7 | 10.9 ± 5 |
| n-Butane | 4.6 ± 2 | 14.7 ± 7 | 10.5 ± 5 | 12.0 ± 6 | 8.1 ± 4 |
| Isobutane | 2.9 ± 1.5 | 9.4 ± 4 | 36.7 ± 15 | 42.1 ± 20 | 5.2 ± 2.5 |
| Other* | 0.1 ± 0.5[a] 4.1 ± 2 | 0.2 ± 0.1 | 0.2 ± 0.1[b] | | 3.5 ± 1.5 |

*Other:
[a]includes propane, propene, pentanes, pentenes, water, trace other hydrocarbons.
[b]Raffinate-2 derived from MTBE production (using BB-stream or Raffinate-1) will include traces of MTBE, methanol, di-methyl ether, and tert-butyl alcohol.

Typical commercially available butene-1 concentrations in Raffinate-2 range from about 15 to about 55 weight %. The above butene-1-containing refinery or steam cracker streams are preferred for making MOH homopolymer or copolymers containing, e.g., ethylene. The instant invention may also make use of BB streams and Raffinate-1 directly, since isobutylene is almost entirely unreactive in the presence of the late-transition-metal catalyst systems. Hence, depending upon shipping costs, convenience, or whatever other factors may affect the decision-making process, one skilled in the art has the option of either acquiring Raffinate-2 and running it through the process of the instant invention or first acquiring either Raffinate-1 or a BB stream, running it through the process, and then shipping the resultant isobutylene-enriched stream to an MTBE plant or other end use. The use of Raffinate-2 is preferred. The use of crude butadiene streams directly is not desired since it would waste butadiene which is hydrogenated prior to polymerization. While it is preferred, It is not required that refinery or steam cracker streams be used and, in fact, it is contemplated that dilute α-olefin containing streams can be prepared by separately combining pure α-olefin and one or more pure diluents, e.g. pure isobutane, such as those typically found in the above refinery or steam cracker streams. If the latter approach is followed, the level of diluent should be based on the teachings herein in order to achieve the advantages of the process disclosed.

It will also be seen that this invention is useful in the production of several MOH polymers and copolymers and may therefore be used in the processing of other dilute refinery or steam cracker streams, such as dilute propene and pentene streams common in the industry. Dilute refinery or steam cracker propene streams, known in the industry as "$C_3$ streams", and dilute refinery or steam cracker pentene streams, known as "$C_5$ streams", are also derived from steam and catalytic cracking and generally can be represented to comprise the following components (ranges, weight %): For $C_3$ streams: Propylene=55±20; Propane=34±15; Ethylene=2±1; Ethane=8±4; and Other=1±0.5 (Other includes methane, acetylenes, propadiene, trace $C_4$'s and $C_5$'s, and trace polar compounds such as water, carbonyl sulfide, methyl mercaptan, and hydrogen sulfide). For $C_5$ streams composition is more complex than that of $C_3$ and $C_4$ streams:

| Component | Range (wt. %) | Component | Range (wt. %) |
|---|---|---|---|
| 2-methyl-Butene-1 | 9.0 ± 4 | n-Pentane | 5.5 ± 2 |
| 3-methyl-Butene-1 | 1.6 ± 1 | Cyclopentane | 0.6 ± .3 |
| Pentene-1 | 5.1 ± 2 | Cyclopentene | 1.5 ± .75 |
| 2-methyl-Butene-2 | 14.9 ± 7 | Piperylene | 0.9 ± .4 |
| Pentene-2 | 15.4 ± 7 | $C_6$ Olefins | 1.5 ± .75 |
| Isoprene | 0.7 ± .3 | $C_6$ Alkyls | 3.5 ± 1.5 |
| Isopentane | 36.2 ± 15 | $C_7$'s and $C_8$'s | 2.0 ± 1 |
| Others* | 1.6 ± 1 | | |

*Others include benzene and polar compounds.

Pentene-1 and cyclopentene are the most reactive components of a $C_5$ stream in the presence of a late-transition-metal catalyst system and are readily separated from each other by distillation and concentrated.

Whether a constituent, e.g. of the refinery or steam cracker stream, qualifies as a diluent under reaction conditions depends on whether it is non-reactive which in turn depends on the specific catalyst and type of pretreatment to which the feed is subjected. "Non-reactive" when used in conjunction with diluent is meant that less than 5 wt. %, preferably less than 3 wt. %, and most preferably less than 1 wt. % of the constituent present in the feed is incorporated into the polymer product and the constituent does not totally deactivate the late-transition-metal catalyst system. Typically, any saturated hydrocarbon constituent will qualify as diluent as well as unsaturated constituents such as butene-2 and isobutylene which are highly unreactive in the presence of a late-transition-metal catalyst system. Materials such as butadiene tend to deactivate the catalyst. Hence, it is preferred that they be removed or at least partially saturated by hydrogenation. Once saturated, the butadiene becomes part of the diluent as butane, butene-2, or a polymerizable α-olefin, butene-1.

The process of the invention is controlled to achieve high ethylene and α-olefin conversion. Conversion is directly proportional to monomer concentration, catalyst concentration and residence time. Accordingly, these parameters are controlled to achieve an ethylene conversion of typically at least 70%, preferably at least 80%, and most preferably at least 90% and can range typically from 70% to 100%, preferably from 80% to 100% and most preferably from 90% to 100% (e.g., 90–95%). The α-olefin conversion is controlled to be typically at least 30%, e.g., at least 40%, preferably at least 50%, and most preferably at least 60% and can range typically from 30% to 95%, preferably from 40% to 90% and most preferably from 50% to 90%. Monomer conversion (%) can be determined by either of the following equations:

$$= \frac{\text{wt/hr of monomer incorporated into polymer}}{\text{wt/hr of monomer in feed}} \times 100; \text{ or}$$

$$= \frac{\text{wt/hr monomer in feed-wt/hr monomer not reacted}}{\text{wt/hr monomer in feed}} \times 100$$

Where a mixed olefin feed is used, e.g., and α-olefin in combination with ethylene, the particular α-olefin conversion employed depends in part on the apparent ethylene content sought to be imparted to the polymer and hence on the ethylene concentration in the mixed feed. For example, at low ethylene content the α-olefin conversion typically will be lower than for high ethylene content feeds. While high conversion can be achieved by any combination of process conditions affecting conversion, it is preferred to maintain a low catalyst concentration and low monomer concentration and attain high conversion with a long residence time. Where ethylene is used as a comonomer, preferably the ethylene conversion is controlled in a manner such that the ratio of the weight % of ethylene in the vapor phase to the weight % of ethylene in the reactant feed stream is typically not greater than 1.2:1, preferably less than 1:1 and most preferably from 0.1:1 to 0.7:1 (e.g., 0.1:1 to 0.5:1). The monomer in the reaction mixture is kept low through the use of the diluent in the feed and operating at high conversions.

The catalyst concentration is typically held just above the poison level due to cost of the catalyst. Preferably the feed is treated to remove most if not all catalyst poisons. Minor poison contamination can be accommodated by increasing the catalyst system concentration with the excess used to remove the poison by reaction therewith. Accordingly, while any effective catalyst concentration can be employed, it is contemplated that such effective amounts will be sufficient to achieve a weight ratio of late-transition-metal catalyst system to polymer product of typically from $1 \times 10^{-6}$:1 to $1 \times 10^{-1}$:1.

The residence time is determined from the following equation:

$$\text{Residence time} = \frac{\text{total true volume of liquid in reactor}}{\text{total volume/time of liquid exiting reactor}}$$

wherein gas bubble volume in the liquid is subtracted from apparent volume of liquid in reactor to obtain true volume. Accordingly, residence times can vary from typically, about 0.1 to about 5 hrs.; preferably from about 0.5 to about 4 hrs.; and more preferably from about 1 to about 3 hrs.

Reaction temperature and pressure are preferably controlled to liquefy the diluent and α-olefin. However, when ethylene is present, the reaction temperature is typically selected to be above the critical temperature of ethylene but below the critical temperature of the α-olefin feed and/or diluent. Accordingly, while any effective temperature can be employed in order to produce the MOH polymer of the desired Mn in an efficient manner, it is contemplated that polymerization will generally be conducted at temperatures of from about 0° C. to about 300° C.; preferably from about 10° C. to about 200° C.; for a feed containing butene-1 such effective temperatures will range typically from about 10° C. to about 150° C., preferably from about 15° C. to about 120° C., and most preferably from 25° C. to about 110° C. For the dilute refinery or steam cracker streams of propylene having propane as the major diluent, the critical temperature of propylene and propane are 92.42° C. (198.36° F.) and 96.7° C. (206.06° F.) respectively, so the typical range of reaction temperatures would be 10 to 96, and preferably from 25 to 92° C. The critical temperature of the feed components in the reactor places an upper limit on temperature when using a boiling reactor since the reflux mechanism becomes useless if nearly all or all of the feed flashes into the reactor vessel and there remains no liquid phase to reflux. In less preferred embodiments, the operation above the critical temperature of the major reactor constituents must be compensated for by assisting or eliminating the reflux mechanism altogether and relying on alternative cooling means, such as jacketed reactor cooling or internal reactor cooling coils. Neither of these solutions is as effective nor as efficient as reflux cooling in maintaining homogeneity of temperature throughout the reaction solution. As indicated above, the boiling reactor represents the preferred method for temperature control. Variations on the boiling reactor configuration include internal reflux, e.g. using cooling coils inserted into the vapor space or an external system wherein vapor is removed from the vapor space and introduced to an external reflux apparatus, the vapor condensed and the condensate returned to the reactor and/or feed. Alternative non-reflux temperature control means include pumparound cooling where liquid is removed from the reactor, cooled, and then returned to the reactor. Pumparound cooling offers the added advantage of being able to return cooled liquid to the reactor using high pressure pumps to also provide mixing of reactor contents with high speed jets.

Reactor pressures are typically controlled to maintain the diluent and α-olefin in liquid form at the selected temperature. In boiling reactors the pressure is selected to obtain boiling of the diluent/α-olefin reactor constituents at the reaction temperature. Accordingly while any effective pressure can be employed it is contemplated that where, e.g., a feedstream containing butene-1 is used, such effective pressures will range typically from about 2.4 to about 39 atm., preferably from about 4.4 to about 28 atm., and most preferably from about 5.6 to about 23.5 atm.

The reaction mixture is preferably vigorously mixed by any suitable means such as impeller, jet pump, or vigorous boiling or combinations thereof. Baffles and strategic placement of feed input can be employed to further facilitate mixing. While conducting the polymerization, there is preferably sufficient mixing in the reactor in order to provide substantial homogeneity and where more than one monomer is used, e.g., ethylene and an α-olefin, sufficient mixing to avoid the production of homopolymer of one or both of the monomers, or a compositionally nonuniform copolymer. More particularly, when two or more monomers are used, it is preferred that the monomers together enter a turbulent zone inside the reactor. This can be accomplished in a stirred reactor, for example, by placing all of the all monomer feed inlets near to each other and near the impeller blade. As described herein, mixing is also facilitated by the use of a dilute pre-mixed feed stream from a refinery or steam cracker. Sufficient mixing in the reactor promotes the random incorporation of each monomer unit in a growing copolymer chain, resulting in copolymers of relatively homogeneous composition (both inter-chain and intra-chain) and relatively short sequences of any one monomer, e.g., ethylene (i.e., low ESL values), compared to analogous copolymers produced without such mixing. Analogously, sufficient mixing provides an opportunity to randomize the structure of the MOH polymer even where a single monomer is used by facilitating mass and heat transfer involving both the catalyst components and the monomer. Effective mixing is especially important to the production of copolymers of the invention having a high concentration of one monomer in a multi-monomer polymerization process (i.e., above 35 weight percent), because, without such mixing, the resulting copolymer would tend to have sufficient monomer sequences to increase the probability of crystallinity, e.g., ethylenic crystallinity in an ethylene copolymer derived from ethylene and an α-olefin, e.g., as manifested by ESL values above 2.50.

When carrying out the polymerization in a batch-type fashion, the reaction diluent (if any), and the monomer or monomers are charged at appropriate concentration (and ratios if more than one is used) to a suitable reactor. Care should be taken that all ingredients are dry, with the reactants typically being passed through molecular sieves or other drying means prior to their introduction into the reactor. Although certain of the late-transition-metal catalysts of this invention may be less susceptible to moisture and other poisons than catalysts such as Ziegler-Natta and metallocenes, it is preferred that the catalyst system be of uniform composition and quality in order to reduce variations in the process and the resulting MOH polymer, e.g., its molecular weight and/or MWD. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

Polymer Characteristics

Employing a late-transition-metal catalyst system in accordance with the procedures and under the conditions as described herein results in a MOH polymer having a high degree of terminal unsaturation, e.g., vinyl and/or vinylene group terminating at least about 30% of the polymer chains. In contrast, prior art polymers produced using a metallocene catalyst system resulted in terminally unsaturated polymers exhibiting a high concentration of vinylidene type unsaturation relative to vinyl type unsaturation, e.g., at least 3.5 to 1; this translates to about 22% vinyl. (see WO 90/1,503) The MOH polymer chains can be represented by the formula POLY—CH=CH$_2$ or POLY—CR'=CH—R wherein POLY represents the polymer chain, —CH=CH$_2$ represents a vinyl group terminating one end of the chain and —CR'=CH—R represents a vinylene group, terminating one end of the chain, wherein R represents an alkyl group such as methyl, ethyl, etc., and R' represents H or an alkyl group such as methyl, ethyl, etc. The MOH polymers typically have vinyl and/or vinylene groups terminating at least about 30 percent of the polymer chains; preferably, at least about 50 percent, more preferably about 75 percent, still more preferably at least about 80 percent, and most preferably at least about 90 percent of the polymer chains; typically from about 30 to about 95 percent, preferably from about 50 to about 90 percent, more preferably from about 75 to about 90 percent of the polymer chains being so terminated. In addition, the polymers typically have vinylidene groups (i.e., POLY—C(—CH$_2$CH$_3$)=CH$_2$, where —C(CH$_2$CH$_3$)=CH$_2$ is ethylvinylidene), terminating no more than 15 percent of the chains; e.g., from about 0 to about 15 percent; preferably from about 2 to about 10 percent. Trisubstituted olefinic groups can also be present in minor amounts, for example, no more than 15 percent of the chains; e.g., from about 0 to about 15 percent; preferably from about 0 to about 10 percent. The predominance of vinyl and vinylene terminal olefinic structures differs significantly from the predominantly terminal vinylidene structures resulting from metallocene catalyzed polymerizations of ethylene α-olefin copolymers. The percentage of polymer chains exhibiting terminal vinyl, vinylene, vinylidene, etc. unsaturation, may be determined by C-13 NMR. It will be understood that a change in the type of late-transition-metal catalyst and/or co-catalyst or activator used to prepare the polymer can shift the above described double bond distribution to some extent. Because of the relatively high level of terminal vinyl and vinylene unsaturation in the MOH polymers, the dispersant additives produced therefrom have a particularly high active ingredient concentrations, thereby providing enhanced lubricating oil dispersancy, which can be exhibited as enhanced sludge and varnish control properties.

The polymers of this invention (including copolymers), particularly for use in dispersant applications, typically have a number average molecular weight ($M_n$) of from about 300 to about 10,000; preferably from about 700 to about 5,000 (e.g., 1,000–5,000), more preferably from about 700 to about 2,500 (e.g., 1,500 to 2,500) and most preferably from about 750 to about 2,500. When lower molecular weight polymers are used in wax crystal modifier applications their Mn is up to about 15,000, e.g., from about 500 to about 15,000. Higher molecular weight polymers of the invention that are oil soluble also find utility in lube oil flow improver and viscosity modifier applications, as well as wax crystal modifiers. For example, useful higher molecular weight polymers and copolymers have Mn of from about 15,000 to about 500,000; preferably from about 30,000 to about 300,000; more preferably from about 45,000 to about 250,000 e.g., from about 50,000 to about 150,000. Typically, selection of molecular weight in viscosity modifier applications is controlled by shear stability requirements of the contemporary marketplace.

The MOH polymers of this invention preferably exhibit a degree of crystallinity such that they are essentially, and substantially, amorphous.

The nature of the catalyst system employed in this invention can result in a phenomenon referred to as "chain straightening," producing polymer chains having monomer sequences which appear to have been derived from ethylene monomer (for the sake of convenience, sometimes referred to herein as "apparent" ethylene content), even in those circumstances in which ethylene monomer is not, in fact, employed in the polymerization. Conversely, the use of ethylene monomer alone in the presence of the recited catalyst system results in chain branching, thus giving the appearance of the use of a higher alkyl comonomer, e.g., propylene, even when none is used. (In comparison, the polymerization of ethylene using a Ziegler-Natta or metallocene catalyst system typically results in less than one branch per hundred carbon atoms as a result of "defective" monomer insertion.) Similarly, in the present invention, polymerization of 1-butene leads to substantial incorporation of linear methylene sequences and a distribution of amorphous chain branches; polymerization of the olefins described leads to branch lengths preferably of from $C_1$–$C_n$, where n is typically 1 to 4.

The α-olefin that is polymerized and the extent and type of branching should be controlled for polymers intended for use in lubricant and fuel applications. For dispersant and lower molecular weight applications, the olefin is preferably at least one selected from $C_2$–$C_8$ monomers (i.e., ethylene and $C_3$–$C_8$ α-olefins); more preferably $C_2$–$C_6$; most preferably $C_2$–$C_4$ olefinic monomers. Very long chain branching should be avoided because dispersancy in, e.g., gasoline engine applications is related to the hydrodynamic volume of the polymer chain. Incorporating most of the molecular weight of the polymer into the backbone is preferred; hence typically at least about 50% of the branches should be methyl and/or ethyl ($C_1$ or $C_2$) and at least about 80% of the branches should be $C_1$–$C_4$; preferably at least about 75% should be $C_1$–$C_2$ and 85% should be $C_1$–$C_4$; more preferably at least about 90% should be $C_1$–$C_2$ and 95% should be $C_1$–$C_4$; most preferably at least about 95% of the branches are $C_1$–$C_4$ branches.

The MOH polymers of the present invention provide a uniquely structured backbone for producing the additives of interest. Prior art polymers and copolymers produced using Ziegler-Natta or metallocene catalyst systems typically contained branches whose length was essentially determined by the monomer which was polymerized; e.g., polymerization of propylene resulted in a polymer containing almost exclusively methyl branches (the exceptions being introduced by incorporation "errors" during polymerization). In contrast, as noted above, the MOH polymers of the present invention contain a distribution of branch lengths which typically result from the polymerization of each monomer or combination of monomers. The distribution of branch lengths results in polymers whose solution properties, response to temperature and wax interaction/cocrystallization response differs from the prior art. These characteristics can be tuned in order to achieve a balance not previously available. Generally, catalyst and process features are selected in order to reduce long ethylene sequences in the polymer backbone and introduce additional branches. This is preferably accomplished by using a Ni-based catalyst and conducting the polymerization at a lower temperature.

Conversely, too little chain branching can lead to insolubility in oil and potential problems with pour point properties. Sufficient chain branching is required so that long, uninterrupted methylene sequences, which are capable of crystallizing at low temperatures and interfering with oil solubility are avoided. Controlled branching and controlled co-crystallization is advantageous in order to modify wax crystal growth in fuel oils so as to optimize such performance in that application. Typically, there should be, on average, at least about 5 branches per 100 carbon atoms, i.e., from about 10 to about 33, for example from about 15 to about 30 branches per 100 carbon atoms of polymer. In various applications the number of branches is preferably from about 11 to about 25 per 100 carbon atoms; more preferably from about 12 to about 20; most preferably from about 13 to about 16; for example, useful polymers are produced having from about 10 to about 12.5 branches per 100 carbon atoms present in the polymer chains. In the present invention additional control means are available at the "polymer design" level to control the polymer structure so that it best suits the particular application. For example, in those applications where the extent of branching would be too great using an α-olefin monomer as the only polymerizable olefin, ethylene can be employed as a comonomer. In this manner additional straight chain segments or methylene sequences can be introduced but, since ethylene polymerized using the catalyst system herein also introduces branches, its use would not introduce, e.g., pour point problems.

For the purposes of the present invention in dispersant applications, the MOH polymer will typically contain not greater than 50 weight percent monomer sequences which appear to be ethylene-monomer derived, based upon the total polymer weight; preferably not greater than 45; and most preferably not greater than 40 weight percent of such apparent ethylene monomer sequences based upon the total polymer weight. Thus, the apparent ethylene content can range typically from 1 to 50 (e.g., from 5 to 50) weight percent, preferably from 5 to 45 (e.g., 5 to 40) weight percent, and most preferably from 10 to 40 (e.g., 10 to 35) weight percent. One can readily calculate the equivalent mole % values for recited ranges based on the particular α-olefin that is used during the polymerization, either alone or in combination with ethylene, for dispersant applications which preferably employ a $C_3$–$C_8$ α-olefin. For example, 50 weight % ethylene in the presence of C3 monomer sequences converts to 60 mole % ethylene, but in the presence of C8 monomer sequences converts to 80 mole %. Similarly, the corresponding values can be calculated for other monomer combinations. For the use of the MOH polymers of the invention as wax crystal modifiers for middle distillate fuels such as diesel fuels and oils such as heating oils, typical ethylene content would be from about 70 to about 90 mole %; preferably from about 74 mole % to about 84 mole %. When used as a viscosity modifier, the polymer can be produced using ethylene, $C_3$–$C_{20}$ α-olefins and mixtures thereof. Polymers of suitable molecular weight typically contain from about 50 mole % apparent ethylene derived sequences to about 78 mole percent for a polymer containing apparent $C_3$ derived sequences and from about 87 mole % to about 96 mole percent ethylene for a $C_{20}$ derived polymer. (These ranges correspond to 40 to 70 weight %; a more preferred range is from about 45 to about 60 weight percent apparent ethylene sequences.)

The polymers of this invention may optionally contain small amounts, e.g., typically up to 10, preferably up to 5 weight percent, of units derived from other α-olefins and $C_3$ to $C_{22}$ diolefins. For example, introduction of small amounts of $C_4$ olefins other than butene-1 can result during the preparation of the MOH polymers through the use of 1-butene monomer feed streams which also contain limited amounts of 2-butene, isobutene, and/or butadiene; similarly, limited amounts of polymerizable monomers may be present in refinery or steam cracker derived $C_3$ and $C_5$ streams.

The MOH polymers of the invention typically also have an average ethylene sequence length (ESL) of from about 1.0 to less than about 3.0; preferably form about 1.0 to about 2.5; more preferably from about 1.0 to about 2.0; for example from about 1.0 to about 1.5. ESL is the ratio of the total number of ethylene units in the copolymer chains to the total number of discrete ethylene sequences in the copolymer chains, as given by the following equation:

$$ESL=(X_{EEE}+X_{REE+EER}+X_{RER})/(X_{RER}+0.5*X_{REE+EER})$$

wherein $X_{EEE}$ is the mole fraction of ethylene-ethylene-ethylene triad sequences in the copolymer; $X_{REE+EER}$ is the mole fraction of higher alkyl, R, such as butene, e.g., butene-ethylene-ethylene and ethylene-ethylene-butene triad sequences; and $X_{RER}$ is the mole fraction of the higher alkyl, R, such as butene-ethylene-butene triad sequences. The ethylene sequences can be present as a result of the copolymerization of ethylene with an α-olefin or, as a result of the use of the late-transition-metal catalyst, "chain straightening" which occurs when polymerizing one or more α-olefins, resulting in the presence of a higher alkyl, R, in the polymer chain. The ESL value is an index reflecting the distribution of the units derived from ethylene or resulting in ethylene sequences (and therefore apparently derived from ethylene) in the MOH polymer chains. As the value for ESL increases for a given MOH polymer of fixed ethylene content (actual or apparent), the number of isolated ethylene units in the chains declines, and, concomitantly, the number of ethylene units per ethylene sequence increases. Naturally, as the ethylene content increases in an MOH polymer containing even a random distribution of ethylene units, the general tendency is to obtain increased ESL values. As per the above equation, the ESL value of a polymer can be calculated from $X_{EEE}$, $X_{REE+EER}$, and $X_{RER}$, where R is, for example, butene, which values are determined from the polymer's C-13 NMR spectrum, using the methods described in, for example, Randall, James C., Journal of Macromolecular Science—Reviews of Macromolecular Chemistry and Physics, C29, 201–317 (1989).

The MOH polymers of this invention preferably also have a molecular weight distribution (MWD), defined as the ratio of the weight average molecular weight ($M_w$) to the number average molecular weight (i.e., MWD=$M_w/M_n$), of less than about 5, preferably less than about 4, and most preferably less than about 3. More specifically, the copolymers have a molecular weight distribution of from about 1.0 to about 3.5, and most preferably from about 1.1 to about 3. It will be appreciated by one skilled in the art that the MWD of the polymer is broadened by variations of temperature, monomer concentration, and catalyst concentration and the specific level will be affected by the specific process conditions selected and the specific catalyst system employed. Both $M_n$ and $M_w$ can be determined by the technique of gel permeation chromatography (GPC) with a suitable calibration curve, from which MWD can be readily obtained. $M_n$ and MWD for ethylene-α-olefin copolymers, for example, can be obtained using calibration curves based upon polydisperse ethylene-α-olefin copolymers having ethylene contents similar to that of the samples under test. For a description of the determination of $M_n$ and MWD using GPC (also known as size exclusion chromatography), see W. W. Yau, J. J. Kirkland and D. D. Bly, "Modern Size Exclusion Liquid Chromatography", John Wiley and Sons, New York, 1979. $M_n$ can alternatively be determined for certain polymers such as ethylene-α-olefin copolymers from either their proton- or carbon-1 3 NMR spectra obtained in solution, using conventional analytical techniques known to those skilled in the art. See, for example, "C13-NMR in Polymer Quantitative Analyses," J. C. Randall and E. T. Hiseh, in: *NMR and Macromolecules, Sequence, Dynamic, and Domain Structure*, ACS Symposium Series No. 247, 131–151 (American Chemical Society, 1984).

Polymer Functionalization and Derivatization

The polymers produced in accordance with the present invention can be functionalized, i.e., chemically modified, to have at least one functional group present within its structure, which functional group is capable of: (1) undergoing further chemical reaction (e.g. derivatization) with other material/or (b) imparting desirable properties, not otherwise possessed by the polymer alone, absent such chemical modification. The functional group can be incorporated into the backbone of the polymer, or can be attached as a pendant group from the polymer backbone. The functional group typically will be polar and contain hetero atoms such as P, O, S, N, halogen and/or boron. It can be attached to the saturated hydrocarbon part of the polymer via substitution reactions or to an olefinic portion via addition or cycloaddition reactions. Alternatively, the functional group can be incorporated into the polymer by oxidation or cleavage of a small portion of the end of the polymer (e.g. as in ozonolysis).

Functionalization of the polymer backbone with substituent functional groups typically relies on an ethylenic unsaturation, preferably a terminal ethylenic unsaturation, present in the polymer for reaction with a functional compound containing or constituting the functional group. Thus, reaction of these functional compounds and the polymer can occur through a variety of mechanisms. Useful and preferred functional groups include halogen, carboxyl materials present as acids, esters, salts, or anhydrides, alcohols, amines, ketones, aldehydes and the like.

Useful functionalization reactions which are generally well known to those skilled in the art include the following. However, the unique features of the MOH polymers of the present invention provide significant advantages not previously available:

(A) reaction of the polymer at its point of unsaturation with carbon monoxide using a Koch-type reaction wherein an acid group such as an iso acid or neo acid is formed. Functionalization of MOH polymers by means of the Koch reaction and production of derivatives therefrom can be carried out according to the general teachings in WO/94/13709, published Jun. 23, 1994 (incorporated herein for the purposes of U.S. prosecution). However, use of the Koch reaction with ethylene/α-olefin copolymers and α-olefin homopolymers containing primarily vinylidene and/or trisubstituted double bonds (e.g., produced by means of metallocene catalyst systems from ethylene and α-olefin feed streams) leads to derivatives containing more than 50% neoacid derivatives. The steric hindrance about the α-carbon of such neoacid derivatives makes such materials more difficult to condense with polyamines to form dispersants. High temperatures and aryl leaving groups are required in order to drive the reaction to completion. The MOH polymer of the present invention which contains a significant concentration of vinyl and/or vinylene terminated polymer chains results in significantly more isoacid structures which are easier to derivatize and therefore more desirable. In particular, the chemically modified MOH polymers of the present invention typically contain less than 50% of neo-substituted carbonyl groups, preferably less than 40%, more preferably less than 30% and most preferably less than 20% neo-substituted carbonyl groups. For example, the modified MOH polymers of the present invention typically will contain from about 5 to less than about 50% neo-substituted carbonyl groups; preferably from about 5 to about 40%; more preferably from about 5 to about 30%; most preferably from about 5 to about 25% of such groups;

(B) hydroformylation or oxycarbonylation with cobalt or rhodium catalysts introduce a carbonyl group at the less hindered end of a trisubstituted double bond, leading to isoaldehydes and acids (see, WO/95/24431, published Sep. 14, 1995; incorporated herein by reference for the purposes of U.S. prosecution); amine derivatives useful as derivatives can be formed by either a single step aminomethylation process or a two step hydroformylation and reductive amination process. However, vinyl olefins which are present at higher concentrations in the MOH polymers of this invention, lead to the completely unhindered primary functional group which is easiest to derivatize. Consequently, the presence of vinyl olefins enables the condensation of the polymeric acid with polyamines directly without the necessity of phenols as leaving groups;

(C) acyl functionalization, and in particular, the preferred maleation reaction, which is the reaction of the polymer at the point of unsaturation with maleic acid or anhydride. A related reaction is the alternating copolymerization of maleic anhydride with polymers containing vinylidene unsaturation, but the degree of polymerization in such systems is limited, e.g., from about 5–10. In contrast, the vinyl groups of the MOH polymers of the present invention are much more amenable to radical initiated copolymerization leading to a significantly higher degree of polymerization (DP), e.g., a DP greater than about 20. The functionalized reaction product can be further reacted with, e.g., amines to produce dispersant products. When the reactant is a polyamine, polyol or aminoalcohol, the reaction is conducted in the presence of sufficient chain-stopping or end-capping co-reactant to ensure a gel-free product (see WO94/13761, published Jun. 23, 1994, incorporated herein by reference for the purposes of U.S. prosecution). Alternatively, functionalization can be accomplished by reaction of the polymer with an unsaturated functional compound using the "ene" reaction absent halogenation;

(D) halogenation of the polymer at the olefinic bond and subsequent reaction of the halogenated polymer with an ethylenically unsaturated functional compound or an amine;

(E) reaction of the polymer with the functional compound by free radical addition using a free radical catalyst; and (F) reaction of the polymer by air oxidation methods, epoxidation, chloroamination or ozonolysis.

(G) reaction of the polymer with at least one phenol group thus permitting derivatization in a Mannich Base-type condensation (see, for example, U.S. Pat. Nos. 5,128,056 issued Jul. 7, 1992 and U.S. Pat. No. 5,200,103 issued Apr. 6, 1993, each incorporated herein by reference for purposes of U.S. prosecution).

Characterization of the degree to which the polymer has been functionalized is referred to herein as "functionality". Functionality refers generally to the average number of functional groups present within the polymer structure per polymer chain. Thus, functionality can be expressed as the average number of moles of functional groups per "mole of polymer". When said "mole of polymer" in the functionality ratio includes both functionalized and unfunctionalized polymer, functionality is referred to herein as F. When said "mole of polymer" includes only functionalized polymer, functionality is referred to herein as F*. Typical analytical techniques employed to determine F* will normally necessitate identification of the weight fraction of functionalized polymer, based on the total weight of polymer (functionalized+unfunctionalized) in the sample being analyzed for functionality. This weight fraction is commonly referred to as Active Ingredient or A.I. Since the determination of A.I. is a separate analytical step, it can be more convenient to express functionality as F rather than F*. In any event, both F and F* are alternate ways of characterizing the functionality.

The particular functionality selected, for polymer intended to be derivatized, will depend on the nature of the derivatization reactions and type and number of chemical linkages established by the derivatizing compound. In most instances, one derivatizing linkage will be formed for each functional group, e.g., each carboxy functional group will form one ester or amide linkage.

Accordingly, while any effective functionality can be imparted to the functionalized polymer intended for subsequent derivatization, it is contemplated that such functionalities, expressed as F*, can be, for dispersant end uses, typically not greater than 3, preferably not greater than 2, and typically can range from 1 to 3, preferably from 1.5 to 2.5, and most preferably from 1.1 to 2 (e.g. 1.2 to 1.3). F and F* values can be related using the A.I., which for polymers of the present invention typically are at least 0.50, preferably from 0.65 to 0.99, more preferably from 0.75 to 0.99, yet more preferably 0.85 to 0.99. However, the upper limit of A.I. is typically from 0.90 to 0.99, and more typically 0.90 to 0.95. Where A.I. is 1.0, F=F*.

As indicated above, a functionalized polymer is one which is chemically modified primarily to enhance its ability to participate in a wider variety of chemical reactions than would otherwise be possible with the unfunctionalized polymer. In contrast, a derivatized polymer is one which has been chemically modified to perform one or more functions in a significantly improved way relative to the unfunctionalized polymer and/or the functionalized polymer. Representative of such functions, are dispersancy and/or viscosity modification in lubricating oil compositions. Typically, derivatization is achieved by chemical modification of the functionalized polymer by reaction with at least one derivatizing compound to form derivatized polymers. The derivatizing compound typically contains at least one reactive derivatizing group capable of reacting with the functional groups of the functionalized polymers, for example, by nucleophilic substitution, Mannich Base condensation, transesterification, salt formations, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline or salt groups derived from reactive metal or reactive metal compounds. Thus, the derivatized polymers can include the reaction product of the above recited functionalized polymer with a nucleophilic reactant, which includes, amines, alcohols, amino-alcohols and mixtures thereof, to form oil soluble salts, amides, imides, oxazoline, reactive metal compounds and esters of mono- and dicarboxylic acids, esters or anhydrides. Suitable properties sought to be imparted to the derivatized polymer include especially dispersancy, but also multifunctional viscosity modification, antioxidancy, friction modification, antiwear, antirust, seal swell, and the like.

Ash-producing detergents can be made using the functionalized polymers of the present invention as exemplified by oil-soluble neutral and basic salts of alkali or alkaline earth metals with alkyl phenols, alkyl sulfonic acids, carboxylic acids, salicylic acids or organic phosphorus acids characterized by at least one direct carbon-to-phosphorus linkage such as those prepared from the functionalized olefin polymer of the present invention (e.g., functionalized polymer having a molecular weight of 1,500) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The alkyl groups of the above acids or compounds constitute the polymer of the present invention. Preferred ash-producing detergents which can be derived from the functionalized polymers of the present invention include the metal salts of alkyl sulfonic acids, alkyl phenols, sulfurized alkyl phenols, alkyl salicylates, alkyl naphthenates and other oil soluble mono- and dicarboxylic acids. Highly basic (viz., overbased) metal salts, such as highly basic alkaline earth metal alkyl sulfonates (especially Ca and Mg salts) are frequently used as detergents.

The derivatized polymer compositions of the present invention can be used as ashless dispersants in lubricant and fuel compositions. Ashless dispersants are referred to as being ashless despite the fact that, depending on their constitution, the dispersants may, upon combustion, yield a non-volatile material such as boric oxide or phosphorus pentoxide. The compounds useful as ashless dispersants generally are characterized by a "polar" group attached to a relatively high molecular weight hydrocarbon chain supplied by the polymer of the present invention. The "polar" group generally contains one or more of the elements nitrogen, oxygen and phosphorus. The solubilizing chains are generally higher in molecular weight than those employed with the metallic based dispersants, but in some instances they may be quite similar. Various types of ashless dispersants can be made by derivatizing the polymer of the present invention and are suitable for use in the lubricant compositions. The following are illustrative (where reference is made to relevant patents, it is to be understood that the cited patents are incorporated herein for the purposes of U.S. prosecution):

1. Reaction products of functionalized polymer of the present invention derivatized with nucleophilic reagents such as amine compounds, e.g. nitrogen-containing compounds, organic hydroxy compounds such as phenols and alcohols, and/or basic inorganic materials. More specifically, nitrogen- or ester-containing ashless dispersants comprise members selected from the group consisting of oil-soluble salts, amides, imides, oxazolines and esters, or mixtures thereof, of the polymer of the present invention, functionalized with mono- and dicarboxylic acids or anhydride or ester derivatives thereof, said polymer having dispersant range molecular weights as defined hereinabove. At least one functionalized polymer is mixed with at least one of amine, alcohol, including polyol, aminoalcohol, etc., to form the dispersant additives. One class of particularly preferred dispersants includes those derived from the polymer of the present invention functionalized mono- or dicarboxylic acid material, e.g. succinic anhydride, and reacted with (i) a hydroxy compound, e.g. pentaerythritol, (ii) a polyoxyalkylene polyamine, e.g. polyoxypropylene diamine, and/or (iii) a polyalkylene polyamine, e.g., polyethylene diamine, tetraethylene pentamine ("TEPA") or triethylene tetramine ("TETA"). Another preferred dispersant class includes those derived from functionalized polymer reacted with (i) a polyalkylene polyamine, e.g. tetraethylene pentamine, and/or (ii) a polyhydric alcohol or polyhydroxysubstituted aliphatic primary amine, e.g., pentaerythritol or trismethylolaminomethane.

Further enhancements in dispersancy can be achieved by the use of materials known as heavy polyalkylene polyamines ("heavy PAM") to introduce an amine as the polar segment of the dispersant (see, e.g., U.S. Ser. No. 322715 filed Oct. 12, 1994; incorporated herein by reference for the purposes of U.S. prosecution). Generally, heavy PAM is a mixture of higher oligomers of polyalkylene amines (e.g., polyethylene) containing essentially no TEPA, at most small amounts of pentaethylene hexamine ("PEHA"), but primarily oligomers with more than 6 nitrogens and more branching than conventional polyamine mixtures. Specifically, heavy PAM typically contains >28% nitrogen (e.g., >32%), an equivalent weight of primary amine groups of between 120–160 grams per equivalent (e.g., 125–140), more than 6 nitrogen atoms per molecule on the average and more than two primary amines per molecule on the average and essentially no oxygen. Heavy PAM is available commercially (e.g., trade name Polyamine HA-2, Dow Chemical Company) and can also be synthesized from polyethylene or polypropylene polyamine. Reduced levels of free, unreacted polyamine is beneficial to diesel engine and elastomer seal performance in vehicles.

2. Reaction products of the polymer of the present invention functionalized with an aromatic hydroxy group and derivatized with aldehydes (especially formaldehyde) and amines (especially polyalkylene polyamines), through the Mannich reaction, which may be characterized as "Mannich dispersants".

3. Reaction products of the polymer of the present invention which have been functionalized by reaction with halogen and then derivatized by reaction with amines (e.g. direct amination), preferably polyalkylene polyamines. These may be characterized as "amine dispersants" and examples thereof are described, for example, in U.S. Pat. Nos. 3,275,554; 3,438,757; 3,454,555; 3,565,804; 3,755,433; 3,822,209 and 5,084,197.

Useful amine compounds for derivatizing functionalized polymers comprise at least one amine and can comprise one or more additional amines or other reactive or polar groups. Where the functional group is a carboxylic acid, ester or derivative thereof, it reacts with the amine to form an amide. Where the functional group is an epoxy it reacts with the amine to form an amino alcohol. Where the functional group is a halide the amine reacts to displace the halide. Where the functional group is a carbonyl group it reacts with the amine to form an imine. Amine compounds useful as nucleophilic reactants for reaction with the functionalized polymer of the present invention include those disclosed in U.S. Pat. Nos. 3,445,441, 5,017,299 and 5,102,566. Preferred amine compounds include mono- and (preferably) polyamines, of 2 to 60, preferably 2 to 40 (e.g. 3 to 20), total carbon atoms of 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitrites, imidazoline groups, and the like. Hydroxy amines with 1 to 6 hydroxy groups, preferably 1 to 3 hydroxy groups, are particularly useful. Preferred amines are aliphatic saturated amines.

The functionalized polymers, particularly acid functionalized polymers, of the present invention can be reacted with alcohols, e.g. to form esters. The alcohols may be aliphatic compounds such as monohydric and polyhydric alcohols or aromatic compounds such as phenols and naphthols. The esters may be prepared, for example, by reacting a suitable alcohol or phenol with the acid or anhydride (i.e., functionalized polymer succinic anhydride). Ester derivatives likewise may be obtained by the reaction of a acid functionalized polymer with epoxide or a mixture of an epoxide and water. Such reaction is similar to one involving the acid or anhydride with a glycol. For instance, the product may be prepared by the reaction of functionalized polymer with alkylene oxide to yield half-esters, monoesters or diesters. In lieu of the acid functionalized polymer, a polymer functionalized with lactone acid or an acid halide may be used in the processes illustrated above for preparing the ester derivatives of this invention. Such acid halides may be acid dibromides, acid dichlorides, acid monochlorides, and acid monobromides. The derivative compositions produced by reacting functionalized polymer with alcohols are esters including both acidic esters and neutral esters. Acidic esters are those in which less than all of the functional groups in functionalized polymer are esterified, and hence possess at least one free functional group. Obviously, acid esters are easily prepared by using an amount of alcohol insufficient to esterify all of the functional groups in the functionalized polymer.

Procedures are well known for reacting high molecular weight carboxylic acids with alcohols to produce acidic esters and neutral esters. These same techniques are applicable to preparing esters from the functionalized polymer of this invention and the alcohols described above. All that is required is that the functionalized polymers of this invention be substituted for the high molecular weight carboxylic acids discussed in these patents, usually on an equivalent weight basis. The following U.S. Patents disclose suitable methods for reacting the functionalized polymers of this invention with the alcohols described above: U.S. Pat. Nos. 3,331,776; 3,381,022; 3,522,179; 3,542,680; 3,697,428 and 3,755,169.

The hydroxy aromatic functionalized polymer aldehyde/amino condensates useful as ashless dispersants in the compositions of this invention include those generally referred to as Mannich condensates. Generally they are made by reacting simultaneously or sequentially at least one active hydrogen compound such as a hydrocarbon-substituted phenol (e.g., hydroxy aromatic functionalized polymer of the present invention), having at least one hydrogen atom bonded to an aromatic carbon, with at least one aldehyde or aldehyde-producing material (typically formaldehyde precursor) and at least one amino or polyamino compound having at least one NH group. Preferred phenolic compounds include the hydroxy aromatic functionalized polymer and useful amine compounds are well known and referred to above. The amine compounds include primary or secondary monoamines having hydrocarbon substituents of 1 to 30 carbon atoms or hydroxyl-substituted hydrocarbon substituents of 1 to about 30 carbon atoms. Another type of typical amine compound are the polyamines. The materials described in the following patents are illustrative of Mannich dispersants: U.S. Pat. Nos. 3,41 3,347; 3,697,574; 3,725,277; 3,725,480; 3,726,882; 4,454,059 and 5,102,566.

A useful group of Mannich Base ashless dispersants are those formed by condensing phenol functionalized polymer with formaldehyde and polyethylene amines, e.g., tetraethylene pentamine, pentaethylene hexamine, polyoxyethylene and polyoxypropylene amines, e.g., polyoxypropylene diamine and combinations thereof. One particularly preferred dispersant comprises a condensation of (A) phenol functionalized polymer, (B) formaldehyde, (C) a polyoxyalkylene polyamine, e.g., polyoxypropylene diamine, and (D) a polyalkylene polyamine, e.g. polyethylene diamine and tetraethylene pentamine, using about 2 to about 8 moles each of (B) and about 1 to about 4 moles of (C) or (D) per mole of (A).

A useful class of nitrogen-containing condensation products for use in the present invention are those made by a "2-step process" as disclosed in U.S. Pat. No. 4,273,891. Briefly, these nitrogen-containing condensates are made by (1) reacting at least phenol functionalized polymer of the present invention with a lower aliphatic $C_1$ to $C_7$ aldehyde or reversible polymer thereof in the presence of an alkaline reagent, such as an alkali metal hydroxide, at a temperature up to about 150° C.; (2) substantially neutralizing the intermediate reaction mixture thus formed; and (3) reacting the neutralized intermediate with at least one compound which contains an amino group having at least one —NH— group. These 2-step condensates can be made from (a) phenol functionalized polymer and (b) formaldehyde, or reversible polymer thereof, (e.g., trioxane, paraformaldehyde) or functional equivalent thereof, (e.g., methylol) and (c) an alkylene polyamine such as ethylene polyamines having between 2 and 10 nitrogen atoms.

Condensates made from sulfur-containing reactants also can be used in the compositions of the present invention. Such sulfur-containing condensates are described in U.S. Pat. Nos. 3,368,972; 3,649,229; 3,600,372; 3,649,659 and 3,741,896. These patents also disclose sulfur-containing Mannich condensates.

4. Useful reactive metals or reactive metal compounds are those which will form metal salts or metal-containing complexes with the functionalized polymer. Metal complexes are typically achieved by reacting the functionalized polymers with amines and/or alcohols as discussed above and also with complex forming reactants either during or subsequent to amination. Reactive metal compounds for use in the formation of complexes with the reaction products of functionalized polymer and amines include those disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence.

Processes are disclosed in U.S. Pat. No. 3,306,908 and Re. 26,433 which are applicable to the carboxylic derivative compositions of the functionalized polymer of this invention with the amines as described above by substituting, on an equivalent basis, the functionalized polymer of this invention with the high molecular weight carboxylic acid functionaiized polymer of U.S. Pat. No. 3,306,908 and carboxylic acylating agents of Re. 26,433. Similarly, the metal salts of U.S. Pat. No. 3,271,310 can be adapted to make the present functionalized polymer.

Lubricant and Fuel-Oil Applications

The polymer of this invention, having a suitable number average molecular weight, may be used as a synthetic base oil. The functionalized polymer, in addition to acting as intermediates for dispersant manufacture, can be used as a molding release agent, molding agent, metal working lubricant, point thickener and the like. The primary utility for the above-described materials, from polymer all the way through and including post-treated derivatized polymer, is as an additive for oleaginous compositions. For ease of discussion, the above-mentioned materials are collectively and individually referred to herein as additives when used in the context of an oleaginous composition containing such "additives". Accordingly, the additives of the present invention may be used by incorporation and dissolution into an oleaginous material such as fuels and lubricating oils. When the additives of this invention are used in normally liquid petroleum fuels such as middle distillates boiling from 65° C. to 430° C., including kerosene, diesel fuels, home heating fuel oil, jet fuels, etc., there is typically used a concentration of the additives in the fuel in the range of from 0.001 to 0.5, and preferably 0.005 to 0.15 wt. %, based on the total weight of the composition. Useful compositions and additives are disclosed in U.S. Pat. No. 5,102,566.

The additives of the present invention, particularly those adapted for use as dispersants, can be incorporated into a lubricating oil in any convenient way. Thus, they can be blended with other additives prior to blending with the oil or added directly to the oil by dispersing or dissolving the same in the oil at the desired level or concentration of the additive; such blending steps can be conducted at room temperature or elevated temperatures. Alternatively, the additives can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from 10 to 80 wt. %, typically 20 to 60 wt. %, and preferably from 40 to 50 wt. %, additive, and typically from 40 to 80 wt. %, preferably from 40 to 60 wt. %, base oil, i.e., hydrocarbon oil based on the concentrate weight. The lubricating oil basestock for the additive typically is adapted to perform a selected function by the incorporation of additional additives therein to form lubricating oil compositions (i.e., formulations). Usually concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, the additives of the present invention and formulations containing them would usually be employed in the form of a 40 to 50 wt. % concentrate, for example, in a lubricating oil fraction.

The additives of the present invention are primarily useful in lubricating oil compositions which employ a base oil in which the additives are dissolved or dispersed therein. Such base oils may be natural or synthetic. Natural base oils include mineral lubricating oils which may vary widely as to their crude source, e.g., whether paraffinic, naphthenic, mixed paraffinic-naphthenic, and the like; as well as to their formation, e.g., distillation range, straight run or cracked, hydrofined, solvent extracted and the like. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention. The additives of the present invention will be generally used in admixture with a lube oil basestock, comprising an oil of lubricating viscosity, including natural and synthetic lubricating oils and mixtures thereof. Useful oils are described in U.S. Pat. Nos. 5,017,299 and 5,084,197. Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Lubricating oils useful in the present invention are typically based on a hydrocarbon mineral oil having a viscosity of about 2–40 centistokes (ASTM D-445) at 100° C. Oils of lubricating viscosity derived from coal or shale are also useful base oils. Lubricating oil basestocks comprised of a mixture of a hydrocarbon mineral oil and up to about 50 weight % of a synthetic lubricating oil are also considered suitable. Synthetic lubricating oils include hydrocarbon oils and halosubstituted hydrocarbon oils such as polymerized and interpolymerized olefins, esters of dibasic acids and complex esters derived from monobasic acids and complex esters derived from monobasic acids, polyglycols, dibasic acids and alcohols. Alkylene oxide polymers and interpolymers and derivatives thereof where the terminal hydroxyl groups have been modified by esterification, etherification, etc., constitute another class of known synthetic lubricating oils. Other suitable classes of synthetic lubricating oils comprise the esters of dicarboxylic acids and silicon and silicate based oils. Additionally, unrefined, refined and rerefined oils can be used in the lubricants of the present invention.

The MOH polymers of the present invention are useful in oil compositions, for example fuel oil compositions, and particularly in fuel oil compositions susceptible to wax formation at low temperatures. Heating oils and other distillate petroleum fuels, for example, diesel fuels, contain alkanes that at low temperatures tend to precipitate as large crystals of wax in such a way as to form a gel structure which causes the fuel to lose its ability to flow. The lowest temperature at which the fuel will flow is known as the pour point.

As the temperature of the fuel falls and approaches the pour point, difficulties arise in transporting the fuel through lines and pumps. Further, the wax crystals tend to plug fuel lines, screens and filters at temperatures above the pour point. These problems are recognized in the art and various additives have been proposed, many of which are in commercial use, for depressing the pour point of fuel oils. Similarly, other additives have been proposed and are in commercial use for reducing the size and changing the shape of wax crystals that do form. Smaller size crystals are desirable since they are less likely to clog a filter; certain additives inhibit the was from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

Preferred MOH polymers of the invention may be further characterized by their beneficial effect on pour point, as determined by ASTM Method No. D97. In this test, measurements are made on solutions comprising a specific concentration of the polymer of the invention in a standard mineral lubricating oil (S150N). The pour point of an oil composition is the lowest temperature at which it will flow when chilled in a specific manner; here, the manner prescribed by ASTM Method No. D97; pour point characterizes the low temperature flow or pumpability properties of fluids such as lubricating and fuel oils. Useful additives can also be produced from the MOH polymers of the invention for use in various middle distillate fuel compositions for lowering the pour point and controlling the size of wax crystals in these products; such additives are known as wax crystal modifiers (WCM). The polymers of the present invention are also useful as "co-additives" with another WCM of the present invention or in combination with prior art WCM additives. Since certain wax crystal modifiers are capable of affecting the size and number of wax crystals (e.g., affecting crystal nucleation processes) and others are capable of affecting the shape of such crystals (e.g., affecting crystal growth processes), preferred performance may be achieved by the judicious combination of WCM additives that are effective in these different respects; each having somewhat different structural characteristics to accomplish their result. For example, polymers of the invention useful for the purpose of affecting nucleation can have fewer than about 10 branches per 100 carbon atoms; useful polymers can have fewer than 6 branches, e.g., about 5 branches per 100 carbon atoms.

The general term "lubricating oil flow improver" (LOFI) is also used to identify those additives which modify the size, number and growth rate of wax crystals in lube oils in such a way as to impart improved low temperature handling, pumpability and/or vehicle operability. Polymers or additives containing polymers, which can also be in various functionalized or derivatized forms, are used for this purpose. In one type of LOFI, the polymer backbone methylene sequences which are randomly distributed are interrupted by branches (and other con-crystallizable segments). It is the sequences that are believed to associate or co-crystallize with the wax crystals and the branches which inhibit or interfere with further crystal growth that would ordinarily occur in their absence. Where the branches are methylene side chains of increased length, such side chains can be particularly effective in treating lube oils containing isoparaffins and n-paraffins. The effectiveness of an additive bears a complex relationship to polymer structure and is not readily predictable.

A requirement of any dispersant additive is that it not adversely affect (i.e., does not significantly increase) the pour point of the lubricating oil composition to which it is added. It is generally accepted that the pour point behavior of dispersant additives is largely determined by the pour point behavior of the polymer from which they are derived. More particularly, the addition to a lubricating oil composition of an effective amount of a dispersant additive produced by the functionalization and/or derivatization, as hereinafter described, of the MOH polymer does not negatively alter the pour point of the composition in a significant way.

The MOH polymers of this invention are also capable of functioning as a wax crystal modifier (WCM) in fuel oil compositions. In this application, performance can be measured by a pour point test, the change in pour point, measured in degrees Centigrade, when an effective amount of the WCM is present in the fuel oil. Performance can also be measured by a filterability test, e.g., the cold filter plugging point ("CFPP") test, which is known to those skilled in the art. The extent of modification of the wax crystal and the effectiveness of the WCM will vary depending on the structural configuration of the WCM. This, in turn, is affected by the monomer used for polymerization, e.g., whether a $C_8$ or a $C_{14}$ is used, or a mixture of monomers. Furthermore, the extent of partial "chain straightening" effected by the particular catalyst employed (as explained elsewhere), will vary the performance of the MOH polymer as a wax crystal modifier. Selection of monomer, catalyst and polymerization conditions can be made in order to maximize performance of the resulting MOH polymer in this application.

Among other factors affecting pour point and/or CFPP performance, besides the extent of branching, are the apparent ethylene content and the number average molecular weight of the polymer. Since higher polymer molecular weight generally increases the viscosity of the oil in which it is dissolved, the choice of polymer molecular weight should be made with consideration of how it will affect the flow properties of the resulting composition. Similarly, higher levels of apparent ethylene sequences results in the potential for greater participation in the crystallization process and solubility in the oil. The extent and nature of branching can serve as a fine tuning variable to "balance" the extent of crystallinity of the WCM itself so that it remains soluble in the oil and still functions to interact with the wax as required.

Lubricating oil formulations containing the additives of the present invention conventionally contain other types of additives that contribute other characteristics that are required in the formulation. Typical of such other additives are detergent/inhibitors, viscosity modifiers, wear inhibitors, oxidation inhibitors, corrosion inhibitors, friction modifiers, foam inhibitors, rust inhibitors, demulsifiers, lube oil flow improvers, and seal swell control agents, etc. Some of the additives can provide multiple effects e.g., a dispersant oxidation inhibitor. Compositions, when containing these additives, typically are blended into the base oil in amounts which are effective to provide their normal attendant function. Representative effective amounts of such additives are illustrated as follows:

| Compositions | Range Broad Wt % | Range Preferred Wt % |
| --- | --- | --- |
| Viscosity Index Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When the polymers of this invention are employed in lubricating oils as viscosity index (VI) improvers or viscosity modifiers their concentration can vary broadly from about 0.001 to 49 wt. %. The proportions giving the preferred results will vary somewhat according to the nature of the lubricating oil basestock and the specific purpose for which the lubricant is to serve in a particular application. When used as lubricating oils for diesel or gasoline engine crankcase lubricants, the polymer concentrations are within the range of about 0.1 to 15.0 wt. % of the total composition which are amounts effective to provide viscosity modification and/or VI improvement.

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from 2.5 to 90%, and preferably from 15 to 75%, and most preferably from 25 to 60% by weight additives in the appropriate proportions with the remainder being base oil. The final formulations may employ typically 10 wt. % of the additive-package with the remainder being base oil. (All weight percents expressed herein, unless otherwise indicated, are based on active ingredient (A.I.) content of the additive, and/or upon the total weight of any additive-package, or formulation which will be the sum of the A.I. weight of each additive plus the weight of total oil or diluent).

EXAMPLES

The following examples are given as illustrations of the claimed invention. It should be understood, however, that the invention is not limited to the specific details set forth in the examples. All parts and percentages in the examples are by weight unless otherwise specified.

Example 1

5 grams of 1-octene in 100 mL of toluene is stirred with 10 mg of the catalyst shown in structure A, below, and 2 mL of 10% methylalumoxane (MAO) in toluene. After the reaction is stirred for 1 hour at room temperature, it was quenched by pouring into 40 mL of ethanol. The polymer was precipitated, collected and dried in vacuuo at 60° C. for 2 hours. Analysis of the polymer using GPC (polystyrene standards) showed Mn=4450 and Mw=8610 (Mw/Mn=1.94). The residual unsaturation as determined by proton NMR was 86% 1,2-disubstituted, 12% vinyl and 2% vinylidene; and it was determined that there were 14.1 branches per 100 carbon atoms.

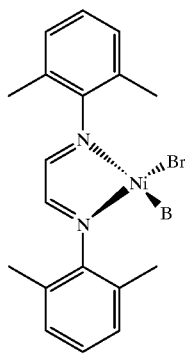

A

Examples 2–4

The procedure of Example 1 was followed except that 10 mL of 1-octene (for example 2) and 10 mL of tetradecene ($C_{14}$) monomer (example 3) in 20 mL of toluene was used and the catalyst contained diisopropyl substitution at each of the aryl groups instead of dimethyl substitution. In example 4, a copolymer containing approximately 20 mole % $C_8$/80 mole % $C_{14}$ was prepared using both 1-octene and tetradecene as in examples 2 and 3. Polymer properties were determined as follows (branching is expressed as the number of methyl branches per 100 carbon atoms using areas estimated from the proton NMR scan):

|  |  |  |  | Proton NMR | | | | |
|---|---|---|---|---|---|---|---|---|
| Example | | GPC | | | 1,2- | Vinyli- | Tri- | |
| (Monomer(s)) | Mn | Mw | Mw/Mn | Vinyl | Disub. | dene | sub. | Branches |
| 2($C_8$) | 93,900 | 178,300 | 1.90 | 31 | 50 | 5 | 14 | 11.8 |
| 3($C_{14}$) | 124,100 | 218,200 | 1.76 | 73 | 18 | 8 | 2 | 7.0 |
| 4($C_8C_{14}$) | 109,100 | 189,400 | 1.74 | 41 | 50 | 8 | 2 | 8.7 |

Example 5

The polymers and copolymer of examples 2–4 were evaluated for their viscosity modifying activity and effect on pour point.

Viscosity Modification 1.0 g of the octene homopolymer of Example 2 were blended in 100 g of a reference oil containing pour point depressant (0.2 weight percent of a dialkyl fumarate-vinyl acetate copolymer lube oil flow improver sold commercially by Exxon Chemical Company, with the balance being S150NL mineral oil). Since the reference oil contains a pour point depressant, it is also used to test for interactions between the viscosity modifier and the pour point additive. The modified oil exhibited a viscosity of 10.61 cSt at 100° C., while the unmodified base stock had a viscosity of 6.07 cSt. The polyoctene polymer showed moderate viscosity modifying activity.

0.8 g of the tetradecene homopolymer of Example 3 were blended in 100 g of S150N lube base stock. The modified base stock exhibited a viscosity of 5.90 cSt at 100° C., while the unmodified base stock had a viscosity of 5.06 cSt. The tetradecene polymer showed some viscosity modifying activity.

Pour Point

The polymers and copolymer of Examples 2–4 were blended in a lube base stock (S150N) at a concentration of 0.4 wt. %; a typical rate for a wax crystal modifier would be approximately 0.1 wt. %. Pour point of each blend was then measured according to ASTM Method No. D97. While it was expected that the polymers would exhibit some level of activity in the base stock, none was observed. It is believed that the lack of activity is a consequence of "chain straightening" resulting from the use of the late-transition-metal catalyst system.

The polymers were evaluated for pour point response in a fuel oil composition (Commercial diesel oil). The polymers were blended at a treat rate of 350 ppm (0.035 wt. %) and 80 ppm (0.008 wt. %). Results are reported as the difference (delta), expressed as positive numbers, in pour point between the modified and unmodified oil (°C.) and are summarized in the following table:

|  | Observed Response, Delta, ° C. | |
|---|---|---|
| Polymer | (@ 80 ppm) | (@ 350 ppm) |
| $C_8$ | 3 | 6 |
| $C_{14}$ | 9 | 12 |
| $C_8C_{14}$ | 9 | 12 |

Each of the polymers shows wax crystal modifier activity; even where none was expected for the C8 polymer. The level of response for the other polymers is also higher than expected.

Example 6

A polymer prepared according to the above procedure and having a Mn of 1,500 and pulverized maleic anhydride is charged at a ratio of 1.6 moles of maleic anhydride to one mole of polymer under dry nitrogen and at atmospheric pressure to a 100 mL pressure reactor equipped with a stirrer and a thermocouple and heated by means of an electric heating mantle. The reaction mixture is heated to 70° C., after which the reactor is gently purged by bubbling dry nitrogen through the liquid reaction mixture for 15 minutes. The purging is then terminated and the reactor sealed. The reactor temperature is then raised to a temperature of 220° C. and is maintained at that temperature for 6 hours while stirring. The reaction is then terminated by cooling the reaction mixture to about 60° C., after which the liquid mixture is transferred to a glass beaker. Unreacted maleic anhydride is stripped off by passing dry nitrogen gas through the liquid at 140° C. The liquid product so prepared contains succinic acid anhydride (SA) functionalized polymer or copolymer and little or no observable sediment.

Example 7

A dispersant material is prepared utilizing the liquid SA modified product as prepared in Example 6. The succinic acid anhydride substituted polymer is dissolved in an equal amount by weight of S150NL mineral oil. To the polymer solution is added tetraethylene pentamine (TEPA), and the mixture is heated to 140° C. under nitrogen while stirring for about 2 to 4 hours. The molar ratio of total succinic anhydride equivalent to polyamine is 2 to 1.

Example 8

About 50 grams of the polymer described in Example 6 are dissolved in 100 mL of chlorobenzene and added to a solution containing about 10 grams of phenol in 300 mL of chlorobenzene. While stirring at room temperature under nitrogen, 0.5 g of $BF_3$ gas is bubbled into the charged solution, and the reaction mixture is stirred while the temperature is increased to 50° C. for about one hour. The reaction mixture is then neutralized with gaseous ammonia until a neutral pH is obtained. The solution is filtered and the filtrate is heated to 150° C. to distill off the solvent and excess phenol. The residue contains polymer-substituted phenol.

To a 500 mL round-bottomed reaction flask is charged 25 grams of S150N lubricating oil in which is dissolved 25 grams of polymer-substituted phenol as just prepared. 0.61 g of 1,6-hexanediamine and 0.35 g of formaldehyde are then added to the flask at 30° C. under nitrogen. The mixture is heated to 115° C. and kept at that temperature for 1 hour, after which the temperature of the reaction mixture is raised to 130° C. and maintained at that temperature for 45 minutes, all the while sweeping the reaction flask with dry nitrogen gas. The stripped reaction mixture is then cooled to room temperature, diluted with 100 mL of heptane, and filtered. The filtrate is then stripped at 130° C. with dry nitrogen gas to remove heptane. The residue contains the derivatized alkylated phenol.

Example 9

A 1500-mL glass reactor equipped with gas inlet and outlet tubes, a thermometer, and a stirrer is charged with 800 grams of the polymer as described in Example 6. The temperature is raised to 200° C. while stirring the polymer. Dry air is bubbled through the copolymer via the inlet tube for 6 hours, all the while maintaining the temperature at 200° C. At the end of 6 hours, the air flow is terminated, and nitrogen is bubbled through the copolymer while cooling the reactor to room temperature; an oxidized polymer product is obtained.

Example 10

A nitrogen-containing dispersant material is prepared utilizing the oxidized polymer product prepared in Example 9. The oxidized polymer is dissolved in an equal amount by weight of S150N mineral oil. To each polymer solution is added tetraethylene pentamine (TEPA), and the mixture is heated to 140° C. under nitrogen while stirring for about 2 to 4 hours. The molar ratio of total polymer to polyamine in terms of equivalents of carboxyl groups in the oxidized polymer to TEPA charged is 2 to 1.

Example 11

803 parts of the polymer of Example 6 are dissolved in 568 parts of iso-octane by mixing and heating to 50° C. in an autoclave. 670 parts of $BF_3.1.1H_2O$ are charged followed immediately by CO to bring the autoclave pressure to 2000 psig. The mixture is stirred for 3 hours at temperature and pressure. Upon release of pressure the reaction product is discharged into an aqueous solution containing 600 parts of sodium fluoride, 756 parts of water, 302 parts of hexane and 50 parts of butanol. The polymer product readily separates from the aqueous phase, is recovered and dried. The polymer product contains neo-carboxylic acid.

Example 12

The procedure described in Example 11 is followed except 153.3 parts of polymer is used, 137.9 parts of n-heptane in place of iso-octane, and 88 parts of $BF_3$.monobutanol is used in the recipe. The recovered, dried polymer contains neo-alky ester.

Example 13

200 parts of a neo-carboxylic acid containing polymer prepared by a process similar to that of Example 11 and 31.2 parts of poly(ethyleneamine) averaging 5–8 nitrogens per molecule (PAM) are charged to a reactor with stirring. The reactor contents are sparged and blanketed with nitrogen, the reactor sealed and pressurized with nitrogen to 60 psig, and heated to 240° C. for five hours. The contents are then sparged with nitrogen via a dip tube and overhead vent line and cooled to 30° C. The resulting polymer product contains carboxylic acid amide.

Example 14

19.4 parts of the aminated polymer described in Example 13 is mixed with 10.0 parts of base oil and heated to 140° C. in a reaction vessel with mixing. Then 1.407 parts of milled 30% boric acid slurry in base oil is slowly added to the vessel. The reactor is sparged with nitrogen at temperature for two hours followed by addition of 6.26 parts of base oil. The vessel contents are cooled to 120° C. and filtered. The resulting product contains active ingredients comprising nitrogen and boron.

Example 15

30 grams of the polymer of Example 6 are combined with 30 grams of hexane, 3.8 grams of 3-dimethylamino propylamine and 26 mg of rhodium dicarbonyl acetylacetonate. The reaction mixture is pressured to 1,000 psi ($6.895 \times 10^6$ $N/m^2$) with carbon monoxide and hydrogen in a 1/1 ratio and heated at 150° C. for 28 hours. Solvent and excess amine are removed by heating and vacuum. The resulting polymer product contains aminated polymer.

Various aspects of the invention and their relationship to one another can be represented as follows:

1. Monounsaturated olefinic hydrocarbon polymer suitable for use as a fuel or lubricant additive, said polymer having the following characteristics:
    (a) an average ethylene sequence length, ESL, of from about 1.0 to less than about 3.0;
    (b) an average of at least 5 branches per 100 carbon atoms of the polymer chains comprising said polymer;
    (c) at least about 50% of said branches being methyl and/or ethyl branches;
    (d) at least about 30% of said polymer chains terminated with a vinyl or vinylene group;
    (e) a number average molecular weight, Mn, of from about 300 to about 10,000; and
    (f) substantial solubility in hydrocarbon and/or synthetic base oil.

2. The polymer of aspect 1 wherein said ESL is from about 1.0 to about 1.5.

3. The polymer of aspect 2 having an average of from about 10 to about 12.5 branches per 100 carbon atoms of said polymer chains.

4. The polymer of aspect 3 wherein at least about 95% of said branches are methyl and/or ethyl branches.

5. The polymer of aspect 4 wherein at least about 95% of said polymer chains are terminated with a vinyl or vinylene group.

6. The polymer of aspect 5 having a number average molecular weight, Mn, of from about 700 to about 2,500.

7. A composition of matter suitable for use as a fuel or lubricant additive consisting essentially of an olefinic hydrocarbon polymer having a nitrogenous head group, said polymer being derived from at least one polymerizable olefinic monomer selected from the group consisting of ethylene, $C_3$–$C_{20}$ α-olefins and a mixture of $C_3$–$C_{20}$ α-olefins, said polymer having the following characteristics:
  (a) an average ethylene sequence length, ESL, of from about 1.0 to less than about 3.0;
  (b) an average of at least 5 branches per 100 carbon atoms of the polymer chains comprising said polymer;
  (c) at least about 50% of said branches being methyl and/or ethyl branches;
  (d) at least about 30% of said polymer chains terminated with a vinyl or vinylene group;
  (e) a number average molecular weight, Mn, of from about 300 to about 10,000; and
  (f) substantial solubility in hydrocarbon and/or synthetic base oil.

8. The composition of matter of aspect 7 wherein said mixture of $C_3$–$C_{20}$ α-olefins is selected from the group consisting of $C_3$, $C_4$, and $C_5$ refinery or steam cracker feedstreams and raffinate derivatives thereof.

9. The composition according to aspect 7 wherein said nitrogenous head group is connected to said polymer backbone via an amide linkage wherein less than about 50% of the carbonyl groups derived from said vinyl or vinylene groups are neo-substituted.

10. The composition according to aspect 7 wherein said polymerizable olefinic monomer is ethylene, said branches in said polymer, element (b), are present at an average of from about 5 to about 33 branches per 100 carbon atoms and said terminal groups of (d) are vinyl.

11. A process for continuously producing monounsaturated olefinic hydrocarbon polymer suitable for use as a fuel or lubricant additive, said polymer having the following characteristics:
  (a) an average ethylene sequence length, ESL, of from about 1.0 to less than about 3.0;
  (b) an average of at least 5 branches per 100 carbon atoms of the polymer chains comprising said polymer;
  (c) at least about 50% of said branches being methyl and/or ethyl branches;
  (d) at least about 30% of said polymer chains terminated with a vinyl or vinylene group;
  (e) a number average molecular weight, Mn, of from about 300 to about 10,000; and
  (f) substantial solubility in hydrocarbon and/or synthetic base oil;
said polymer derived from at least one polymerizable olefinic monomer selected from the group consisting of ethylene, $C_3$–$C_{20}$ α-olefins and a mixture of $C_3$–$C_{20}$ α-olefins and polymerized in the presence of a late-transition-metal catalyst system in a reaction zone containing liquid phase, said process further comprising:

(A) when at least one α-olefin monomer is selected, continuously providing said α-olefin as a dilute, liquefied α-olefin feed stream from a refinery or steam cracker, said feed stream containing diluent admixed therewith wherein the amount of diluent in said feed stream is at least 30 weight percent thereof;

(B) when ethylene is selected, continuously providing a feed stream comprising ethylene in liquid, vapor, or liquid/vapor form;

(C) when a mixture of ethylene and an α-olefin is selected, admixing the feed streams of steps (A) and (B) to provide a reactant feed stream having an α-olefin/ethylene weight ratio effective to yield a polymer containing an average ethylene sequence length, ESL, of from about 1.0 to less than about 3.0;

(D) continuously introducing said feed stream or said reactant feed stream derived in accordance with steps (A), (B) or (C) and late-transition-metal catalyst system into the liquid phase of the reaction zone in a manner and under conditions sufficient to:
  (i) polymerize the ethylene and/or α-olefin to polymer product having a number average molecular weight of not greater than 10,000;
  (ii) obtain an α-olefin conversion, when an α-olefin is used as a monomer, of at least 30%;
  (iii) obtain an ethylene conversion, where ethylene is used as a monomer, of at least 70%

(E) continuously withdrawing said polymer from the reactor.

12. The process of aspect 11 wherein at least 50 weight % of the constituents of said diluent possess a boiling point under reaction conditions within ±20° C. of the average boiling point of the α-olefin constituents of the feed stream.

13. The process of aspect 11 or aspect 12 wherein the contents of the reaction zone are maintained at a temperature above the critical temperature of ethylene and below the critical temperature of said α-olefin, as appropriate, when ethylene and/or at least one α-olefin is present.

14. The process of any of aspects 11 to 13 wherein said α-olefin monomer comprises at least one monomer selected from the group consisting of butene-1, propylene, and pentene-1 and said diluent comprises substantially nonpolymerizable $C_3$, $C_4$, $C_5$ hydrocarbons and mixtures thereof, other than said α-olefin monomer.

15. The process of any of aspects 11 to 14 wherein the polymerization reaction temperature is controlled by evaporative cooling means.

16. The process of aspect 15 wherein in step (D) continuously the vapor above the liquid phase is at least partially condensed and the condensate is returned to said liquid phase.

17. The process of aspect 11 wherein said dilute liquefied α-olefin feed stream is derived from a refinery or steam cracker stream comprising at least one α-olefin from which dienes, but not polar compounds, are substantially removed prior to introduction of said feed stream into said reactor.

18. A functionalized polymer wherein the polymer prior to functionalization is as in aspect 1 or aspect 6.

19. The reaction product of the polymer of aspect 1 with an enophile.

20. The product of aspect 19 wherein said enophile is maleic anhydride.

21. The reaction product of aspect 20 further reacted with a member selected from the group consisting of amines and alcohols.

22. The reaction product of aspect 19 wherein said reaction is initiated using one or more free radical generating compound and wherein said reaction product contains an average of at least 2 of said polymer chains linked to said enophile.

23. The reaction product of aspect 22 further reacted with polyamine and monofunctional chain stopping agent.

24. The functionalized polymer of aspect 1, wherein the polymer is functionalized with at least one member selected from the group consisting of $C_3$ to $C_{10}$ mono-unsaturated monocarboxylic acid producing moieties and $C_4$ to $C_{10}$ mono-unsaturated dicarboxylic acid producing moieties.

25. A functionalized polymer comprising an oxidized polymer, wherein said oxidized polymer is the reaction product of the polymer of aspect 1 or aspect 6 and a gas selected from the group consisting of an oxygen-containing gas, an ozone-containing gas and mixtures thereof.

26. A derivatized polymer useful as a lubricating oil dispersant additive, which comprises the reaction product of the functionalized polymer of any of aspects 19 to 25 and a derivatizing compound.

27. The derivatized polymer of aspect 26 in which the functionalized polymer is reacted with at least one nucleophilic reagent selected from amines, alcohols, metal reactants, and mixtures thereof.

28. The reaction product of aspect 27 in which said amine is a heavy polyamine.

29. A derivatized polymer comprising the reaction product of:
  (a) at least one alkyl-substituted hydroxyaromatic compound formed by the alkylation of at least one hydroxy aromatic compound with the polymer as in aspect 1;
  (b) at least one aldehyde reactant; and
  (c) at least one nucleophilic reactant.

30. The reaction product of the polymer of aspect 1 further reacted with a phenol in the presence of an acid catalyst.

31. The reaction product of aspect 30 further reacted with a member selected from the group consisting of aldehyde and polyamine.

32. The reaction product of aspect 31 in which said polyamine is a heavy polyamine.

33. A lubricating oil composition comprising a major amount of basestock lubricating oil of lubricating viscosity, and an effective amount of a viscosity modifier comprising monounsaturated olefinic hydrocarbon polymer suitable for use as a fuel or lubricant additive, said polymer having the following characteristics:
  (a) an average ethylene sequence length, ESL, of from about 1.0 to less than about 3.0;
  (b) an average of at least 5 branches per 100 carbon atoms of the polymer chains comprising said polymer;
  (c) at least about 50% of said branches being methyl and/or ethyl branches;
  (d) at least about 30% of said polymer chains terminated with a vinyl or vinylene group;
  (e) a number average molecular weight, Mn, of from about 15,000 to about 500,000; and
  (f) substantial solubility in hydrocarbon and/or synthetic base oil.

34. A lubricating oil composition comprising a major amount of a lubricating base oil, lubricating oil flow improver, and a minor amount of oil soluble polymer as in aspect 33.

35. The lubricating oil composition of aspect 34, containing from 0.01 to 5 weight percent of said lubricating oil flow improver and from 0.1 to 20 weight percent of the said polymer, based on the total weight of the composition.

36. An oil additive concentrate composition comprising hydrocarbon mineral oil diluent and about 2 to 50 wt. % based on the total amount of hydrocarbon mineral oil diluent of monounsaturated olefinic hydrocarbon polymer suitable for use as a fuel or lubricant additive, said polymer having the following characteristics:
  (a) an average ethylene sequence length, ESL, of from about 1.0 to less than about 3.0;
  (b) an average of at least 5 branches per 100 carbon atoms of the polymer chains comprising said polymer;
  (c) at least about 50% of said branches being methyl and/or ethyl branches;
  (d) at least about 30% of said polymer chains terminated with a vinyl or vinylene group;
  (e) substantial solubility in hydrocarbon and/or synthetic base oil.

37. The oil additive concentrate according to aspect 36, wherein said polymer has a number average molecular weight of from about 15,000 to about 500,000.

38. An oil additive concentrate composition comprising hydrocarbon mineral oil diluent and about 2 to 50 wt. % based on the total amount of hydrocarbon mineral oil diluent of a derivatized polymer useful as a lubricating oil dispersant additive, which derivatized polymer comprises the reaction product of the functionalized polymer of any of aspects 19 to 25.

39. A lubricating oil composition comprising base oil and, as a dispersant additive, a functionalized or derivatized polymer as in any of aspects 19 to 29, in the form of either:
  (a) a concentrate containing from 11 to 80 weight percent of said dispersant additive; or
  (b) a composition containing from 0.1 to 10 weight percent of said dispersant additive.

40. A fuel oil composition comprising base oil and, as a dispersant additive, a functionalized or derivatized polymer as in any of aspects 19 to 29, in the form of either:
  (a) a concentrate containing from 11 to 80 weight percent of said dispersant additive; or
  (b) a composition containing from 0.001 to 0.1 weight percent of said dispersant additive.

41. A process for continuously producing monounsaturated olefinic hydrocarbon polymer suitable for use as a fuel or lubricant additive, said polymer derived from at least one polymerizable olefinic monomer selected from the group consisting of ethylene, $C_3$–$C_{20}$ α-olefins and a mixture of $C_3$–$C_{20}$ α-olefins and polymerized in the presence of a late-transition-metal catalyst system in a reaction zone containing liquid phase, said process further comprising:
  (A) when at least one α-olefin monomer is selected, continuously providing said α-olefin as a dilute, liquefied α-olefin feed stream from a refinery or steam cracker, said feed stream containing diluent admixed therewith wherein the amount of diluent in said feed stream is at least 30 weight percent thereof;
  (B) when ethylene is selected, continuously providing a feed stream comprising ethylene in liquid, vapor, or liquid/vapor form;
  (C) when a mixture of ethylene and an α-olefin is selected, admixing the feed streams of steps (A) and (B) to provide a reactant feed stream having an α-olefin/ethyiene weight ratio effective to yield a polymer containing an average ethylene sequence length, ESL, of from about 1.0 to less than about 3.0;
  (D) continuously introducing said feed stream or said reactant feed stream derived in accordance with steps (A), (B) or (C) and late-transition-metal catalyst system into the liquid phase of the reaction zone in a manner and under conditions sufficient to:

(i) polymerize the ethylene and/or α-olefin to polymer product having a number average molecular weight suitable for use as a fuel or lubricant additive;

(ii) obtain an α-olefin conversion, when an α-olefin is used as a monomer, of at least 30%;

(iii) obtain an ethylene conversion, where ethylene is used as a monomer, of at least 70%

(E) continuously withdrawing said polymer from the reactor.

We claim:

1. Monounsaturated olefinic hydrocarbon polymer suitable for use as a fuel or lubricant additive, said polymer having the following characteristics:

(a) an average ethylene sequence length, ESL, of from about 1.0 to about 1.5;

(b) an average of at least 5 branches per 100 carbon atoms of the polymer chains comprising said polymer;

(c) at least about 50% of said branches being methyl and/or ethyl branches;

(d) at least about 30% of said polymer chains terminated with a vinyl or vinylene group;

(e) a number average molecular weight, Mn, of from about 300 to about 10,000; and (f) substantial solubility in hydrocarbon and/or synthetic base oil.

2. The polymer of claim 1 having an average of from about 10 to about 12.5 branches per 100 carbon atoms of said polymer chains.

3. The polymer of claim 2 wherein at least about 95% of said branches are methyl and/or ethyl branches.

4. The polymer of claim 3 wherein at least about 95% of said polymer chains are terminated with a vinyl or vinylene group.

5. The polymer of claim 4 having a number average molecular weight, Mn, of from about 700 to about 2,500.

6. A derivatized polymer useful as a lubricating oil dispersant additive which comprises the functionalized reaction product of the polymer of claim 1 wherein said functionalized polymer is reacted with at least one nucleophilic reagent selected from amines, alcohols, metal reactants, and mixtures thereof.

7. The reaction product of claim 6 in which said amine is a heavy polyamine.

8. The polymer of claim 1 wherein said polymer is functionalized.

9. A composition of matter suitable for use as a fuel or lubricant additive consisting essentially of an olefinic hydrocarbon polymer having a nitrogenous head group, said polymer being derived from at least one polymerizable olefinic monomer selected from the group consisting of ethylene, $C_3$–$C_{20}$ α-olefins and a mixture of $C_3$–$C_{20}$ α-olefins, said mixture selected from the group consisting of $C_3$, $C_4$ and $C_5$ refinery or steam cracker feedstreams and raffinate derivatives thereof, said polymer having the following characteristics:

(a) an average ethylene sequence length, ESL, of from about 1.0 to less than about 3.0;

(b) an average of at least 5 branches per 100 carbon atoms of the polymer chains comprising said polymer;

(c) at least about 50% of said branches being methyl and/or ethyl branches;

(d) at least about 30% of said polymer chains terminated with a vinyl or vinylene group;

(e) a number average molecular weight, Mn, of from about 300 to about 10,000; and (f) substantial solubility in hydrocarbon and/or synthetic base oil.

10. The composition according to claim 9 wherein said nitrogenous head group is connected to said polymer backbone via an amide linkage wherein less than about 50% of the carbonyl groups derived from said vinyl or vinylene groups are neo-substituted.

11. The composition according to claim 9 wherein said polymerizable olefinic monomer is ethylene, said branches in said polymer, element (b), are present at an average of from about 5 to about 33 branches per 100 carbon atoms and said terminal groups of (d) are vinyl.

12. A process for continuously producing monounsaturated olefinic hydrocarbon polymer suitable for use as a fuel or lubricant additive, said polymer having the following characteristics:

(a) an average ethylene sequence length, ESL, of from about 1.0 to less than about 3.0;

(b) an average of at least 5 branches per 100 carbon atoms of the polymer chains comprising said polymer;

(c) at least about 50% of said branches being methyl and/or ethyl branches;

(d) at least about 30% of said polymer chains terminated with a vinyl or vinylene group;

(e) a number average molecular weight, Mn, of from about 300 to about 10,000; and (f) substantial solubility in hydrocarbon and/or synthetic base oil;

said polymer derived from at least one polymerizable olefinic monomer selected from the group consisting of ethylene, $C_3$–$C_{20}$ α-olefins and a mixture of $C_3$–$C_{20}$ α-olefins and polymerized in the presence of a late-transition-metal catalyst system in a reaction zone containing liquid phase, said process further comprising:

(A) when at least one α-olefin monomer is selected, continuously providing said α-olefin as a dilute, liquefied α-olefin feed stream from a refinery or steam cracker, said feed stream containing diluent admixed therewith wherein the amount of diluent in said feed stream is at least 30 wt. % thereof, and wherein at least 50 wt. % of the constituents of said diluent possess a boiling point under reaction conditions within ±20° C. of the average boiling point of the α-olefin constituents of the feed stream;

(B) when ethylene is selected, continuously providing a feed stream comprising ethylene in liquid, vapor, or liquid/vapor form;

(C) when a mixture of ethylene and an α-olefin is selected, admixing the feed streams of steps (A) and (B) to provide a reactant feed stream having an α-olefin/ethylene weight ratio effective to yield a polymer containing an average ethylene sequence length, ESL, of from about 1.0 to less than about 3.0;

(D) continuously introducing said feed stream or said reactant feed stream derived in accordance with steps (A), (B) or (C) and late-transition-metal catalyst system into the liquid phase of the reaction zone in a manner and under conditions sufficient to:

(i) polymerize the ethylene and/or α-olefin to polymer product having a number average molecular weight of not greater than 10,000;

(ii) obtain an α-olefin conversion, when an α-olefin is used as a monomer, of at least 30%;

(iii) obtain an ethylene conversion, where ethylene is used as a monomer, of at least 70%

(E) continuously withdrawing said polymer from the reactor.

13. The process of claim 12 wherein the contents of the reaction zone are maintained at a temperature above the critical temperature of ethylene and below the critical temperature of said α-olefin, as appropriate, when ethylene and/or at least one α-olefin is present.

14. The process of claim 12 wherein said α-olefin monomer comprises at least one monomer selected from the group consisting of butene-1, propylene, and pentene-1 and said diluent comprises substantially nonpolymerizable $C_3$, $C_4$, $C_5$ hydrocarbons and mixtures thereof, other than said α-olefin monomer.

15. The process of claim 12 wherein the polymerization reaction temperature is controlled by evaporative cooling means.

16. The process of claim 15 wherein in step (D) continuously the vapor above the liquid phase is at least partially condensed and the condensate is returned to said liquid phase.

17. The process of claim 12 wherein said dilute liquefied α-olefin feed stream is derived from a refinery or steam cracker stream comprising at least one α-olefin from which dienes, but not polar compounds, are substantially removed prior to introduction of said feed stream into said reactor.

18. A reaction product of a functional compound with a monounsaturated olefinic hydrocarbon polymer by the ene reaction, wherein said monounsaturated olefinic hydrocarbon polymer has the following characteristics:
    (a) an average ethylene sequence length, ESL, of from about 1.0 to less than about 3.0;
    (b) an average of at least 5 branches per 100 carbon atoms of the polymer chains comprising said polymer;
    (c) at least 50% of said branches being methyl and/or ethyl branches;
    (d) at least about 30% of said polymer chains terminated with a vinyl or vinylene group;
    (e) a number average molecular weight, Mn, of from about 300 to about 10,000; and
    (f) substantial solubility in hydrocarbon and/or base oil.

19. The product of claim 18 wherein said functional compound, is maleic anhydride.

20. The reaction product of claim 19 further reacted with a member selected from the group consisting of amines and alcohols.

21. A reaction product of a functional compound with a monounsaturated olefinic hydrocarbon polymer having the following characteristics:
    (a) an average ethylene sequence length, ESL, of from about 1.0 to less than about 3.0;
    (b) an average of at least 5 branches per 100 carbon atoms of the polymer chains comprising said polymer;
    (c) at least 50% of said branches being methyl and/or ethyl branches;
    (d) at least about 30% of said polymer chains terminated with a vinyl or vinylene group;
    (e) a number average molecular weight, Mn of from about 300 to about 10,000; and
    (f) substantial solubility in hydrocarbon and/or base oil, wherein said reaction is initiated using one or more free radical generating compounds and wherein said reaction product contains an average of at least 2 of said polymer chains linked to said functional compound.

22. The reaction product of claim 21 further reacted with polyamine and monofunctional chain stopping agent.

23. The functionalized polymer reaction product of at least one member selected from the group consisting of $C_3$ to $C_{10}$ monounsaturated monocarboxylic acid producing moieties and $C_4$ to $C_{10}$ monounsaturated dicarboxylic acid producing moieties with a monounsaturated olefinic hydrocarbon polymer having the following characteristics:
    (a) an average ethylene sequence length, ESL, of from about 1.0 to less than about 3.0;
    (b) an average of at least 5 branches per 100 carbon atoms of the polymer chains comprising said polymer;
    (c) at least about 50% of said branches being methyl and/or ethyl branches;
    (d) at least about 30% of said polymer chains terminated with a vinyl or vinylene group;
    (e) a number average molecular weight, Mn, of from about 300 to about 10,000; and
    (f) substantial solubility in hydrocarbon and/or synthetic base oil.

24. A functionalized polymer comprising an oxidized polymer, wherein said oxidized polymer is the reaction product of a monounsaturated olefinic hydrocarbon polymer having the following characteristics:
    (a) an average ethylene sequence length, ESL, of from about 1.0 to less than about 3.0;
    (b) an average of at least 5 branches per 100 carbon atoms of the polymer chains comprising said polymer;
    (c) at least about 50% of said branches being methyl and/or ethyl branches;
    (d) at least about 30% of said polymer chains terminated with a vinyl or vinylene group;
    (e) a number average molecular weight, Mn, of from about 300 to about 10,000;
    (f) substantial solubility in hydrocarbon and/or synthetic base oil; and
    (g) a gas selected from the group consisting of an oxygen-containing gas, an ozone-containing gas and mixtures thereof.

25. A derivatized polymer comprising the reaction product of:
    (a) at least one alkyl-substituted hydroxyaromatic compound formed by the alkylation of at least one hydroxy aromatic compound with a monounsaturated olefinic hydrocarbon polymer having the following characteristics:
        (i) an average ethylene sequence length, ESL, of from about 1.0 to less than about 3.0;
        (ii) an average of at least 5 branches per 100 carbon atoms of the polymer chains comprising said polymer;
        (iii) at least about 50% of said branches being methyl and/or ethyl branches;
        (iv) at least about 30% of said polymer chains terminated with a vinyl or vinylene group;
        (v) a number average molecular weight, Mn, of from about 300 to about 10,000;
        (vi) substantial solubility in hydrocarbon and/or synthetic base oil;
    (b) at least one aldehyde reactant; and
    (c) at least one nucleophilic reactant.

26. The reaction product of a monounsaturated olefinic hydrocarbon polymer having the following characteristics:
    (a) an average ethylene sequence length, ESL, of from about 1.0 to less than about 3.0;
    (b) an average of at least 5 branches per 100 carbon atoms of the polymer chains comprising said polymer;

(c) at least about 50% of said branches being methyl and/or ethyl branches;

(d) at least about 30% of said polymer chains terminated with a vinyl or vinylene group;

(e) a number average molecular weight, Mn, of from about 300 to about 10,0000; and (f) substantial solubility in hydrocarbon and/or synthetic base oil; with a phenol in the presence of an acid catalyst.

27. The reaction product of claim 26 further reacted with a member selected from the group consisting of aldehyde and polyamine.

28. The reaction product of claim 27 in which said polyamine is a heavy polyamine.

29. A lubricating oil composition comprising a major amount of basestock lubricating oil of lubricating viscosity and from 0.01 to 5 wt. % of lubricating oil flow improver and from 0.1 to 20 wt. % of a viscosity modifier comprising a monounsaturated olefinic hydrocarbon polymer having the following characteristics:

(a) an average ethylene sequence length, ESL, of from about 1.0 to less than about 3.0;

(b) an average of at least 5 branches per 100 carbon atoms of the polymer chains comprising said polymer;

(c) at least about 50% of said branches being methyl and/or ethyl branches;

(d) at least about 30% of said polymer chains terminated with a vinyl or vinylene group;

(e) a number average molecular weight, Mn, of from about 300 to about 10,000; and (f) substantial solubility in hydrocarbon and/or synthetic base oil.

30. An oil additive concentrate comprising hydrocarbon mineral oil diluent and about 2 to 50 wt. % based on the total amount of hydrocarbon mineral oil diluent of a monounsaturated olefinic hydrocarbon polymer having the following characteristics:

(a) an average ethylene sequence length, ESL, of from about 1.0 to less than about 1.5;

(b) an average of at least 5 branches per 100 carbon atoms of the polymer chains comprising said polymer;

(c) at least 50% of said branches being methyl and/or ethyl branches;

(d) at least about 30% of said polymer chains terminated with a vinyl or vinylene group;

(e) a number average molecular weight, Mn, of from about 15,000 to 500,000; and (f) substantial solubility in hydrocarbon and/or base oil.

* * * * *